Nov. 7, 1967     E. MEILI     3,351,037
CROSS-COUNTRY MOTOR DRIVEN VEHICLES
Filed July 6, 1962     18 Sheets-Sheet 2

INVENTOR.
Ernst Meili
BY

Nov. 7, 1967  E. MEILI  3,351,037
CROSS-COUNTRY MOTOR DRIVEN VEHICLES
Filed July 6, 1962  18 Sheets—Sheet 4

INVENTOR.
Ernst Meili
BY

Nov. 7, 1967   E. MEILI   3,351,037
CROSS-COUNTRY MOTOR DRIVEN VEHICLES
Filed July 6, 1962   18 Sheets-Sheet 5

INVENTOR.
Ernst Meili
BY

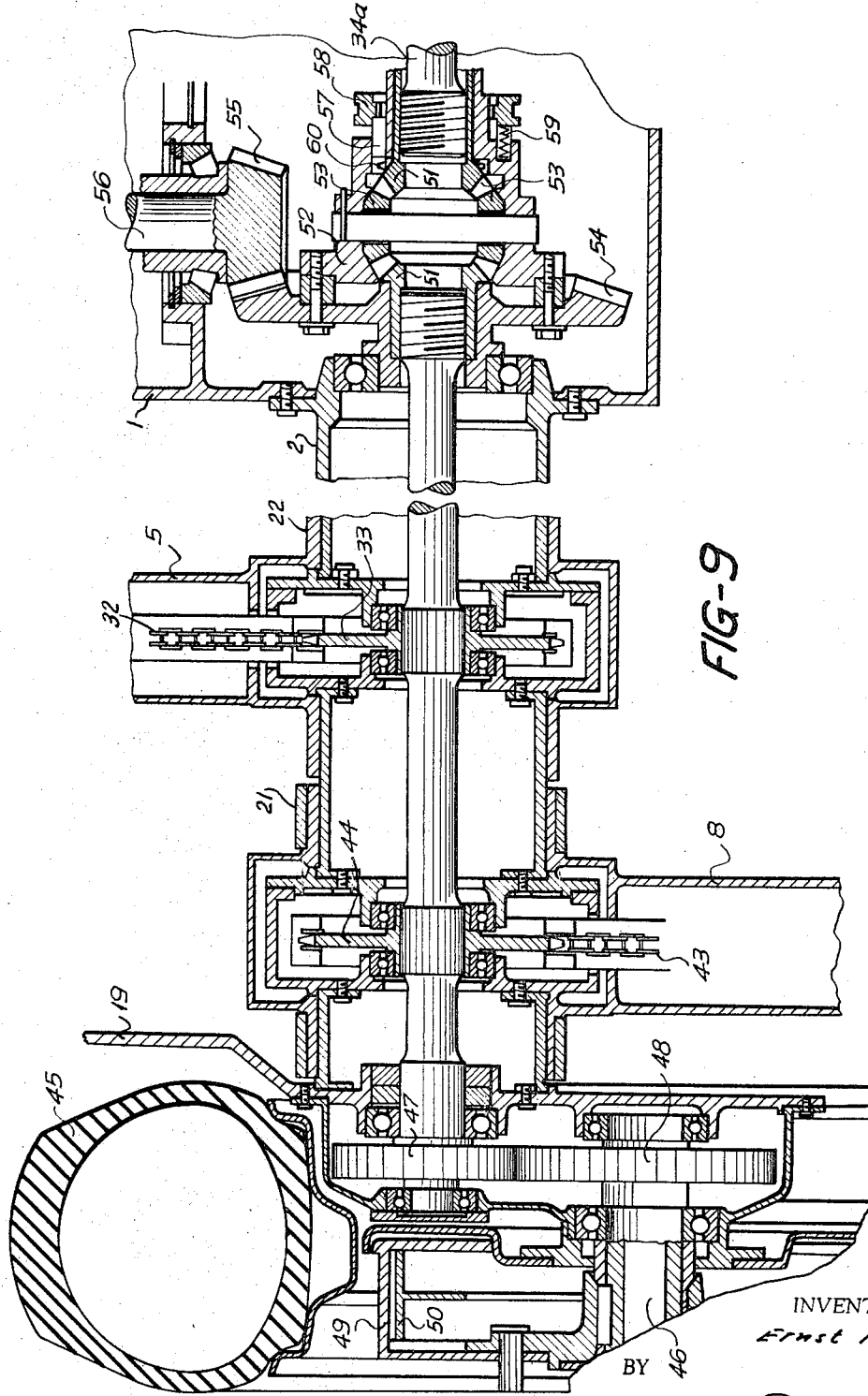

Nov. 7, 1967                  E. MEILI                  3,351,037
CROSS-COUNTRY MOTOR DRIVEN VEHICLES
Filed July 6, 1962                                18 Sheets-Sheet 7
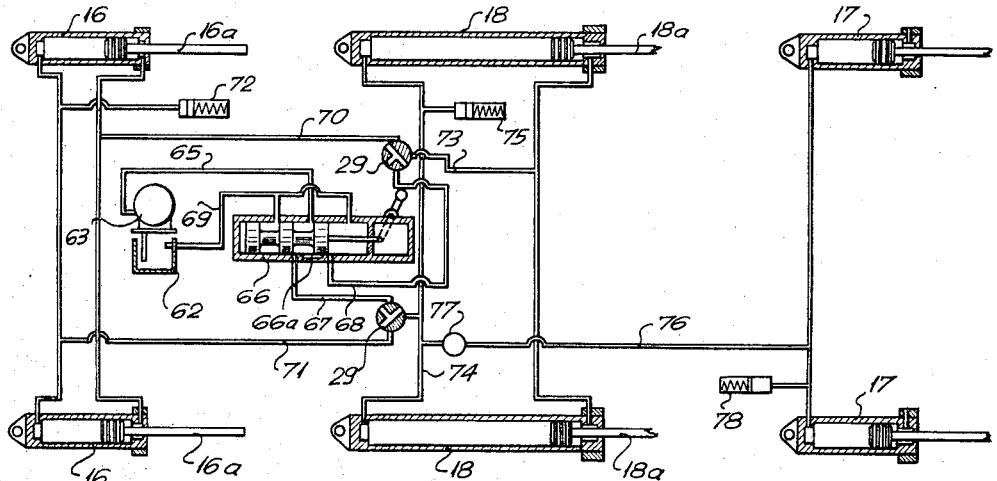
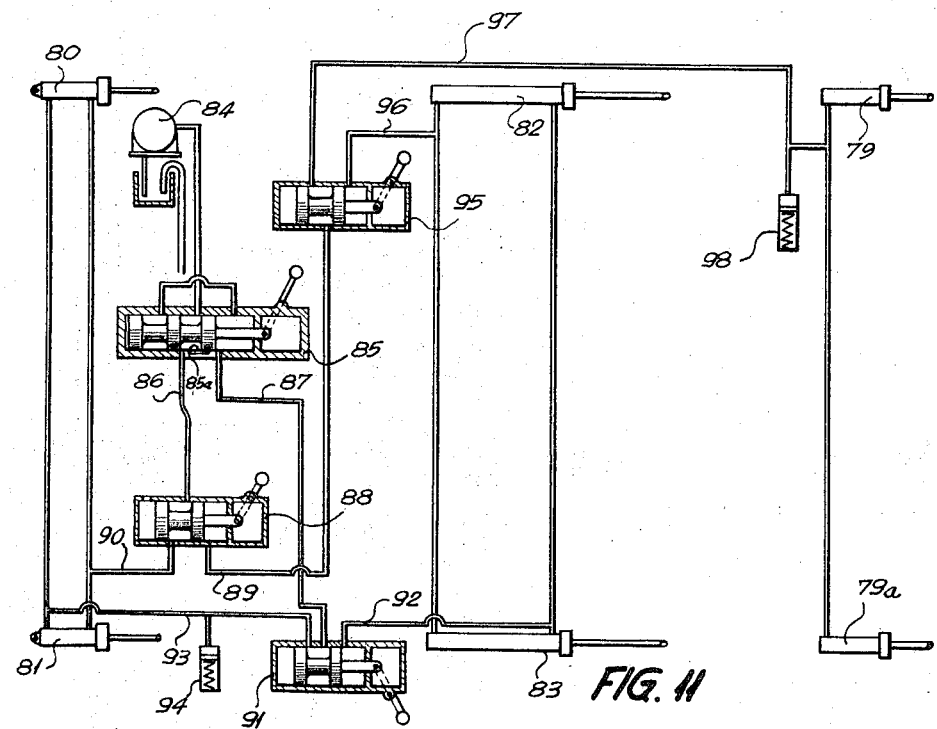
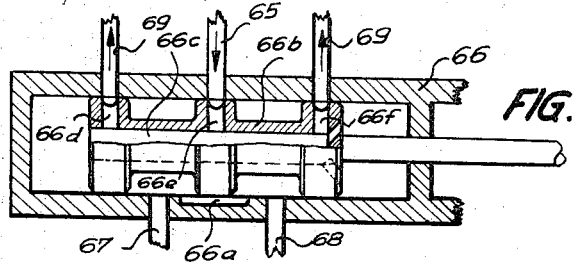
INVENTOR.
Ernst Meili
BY

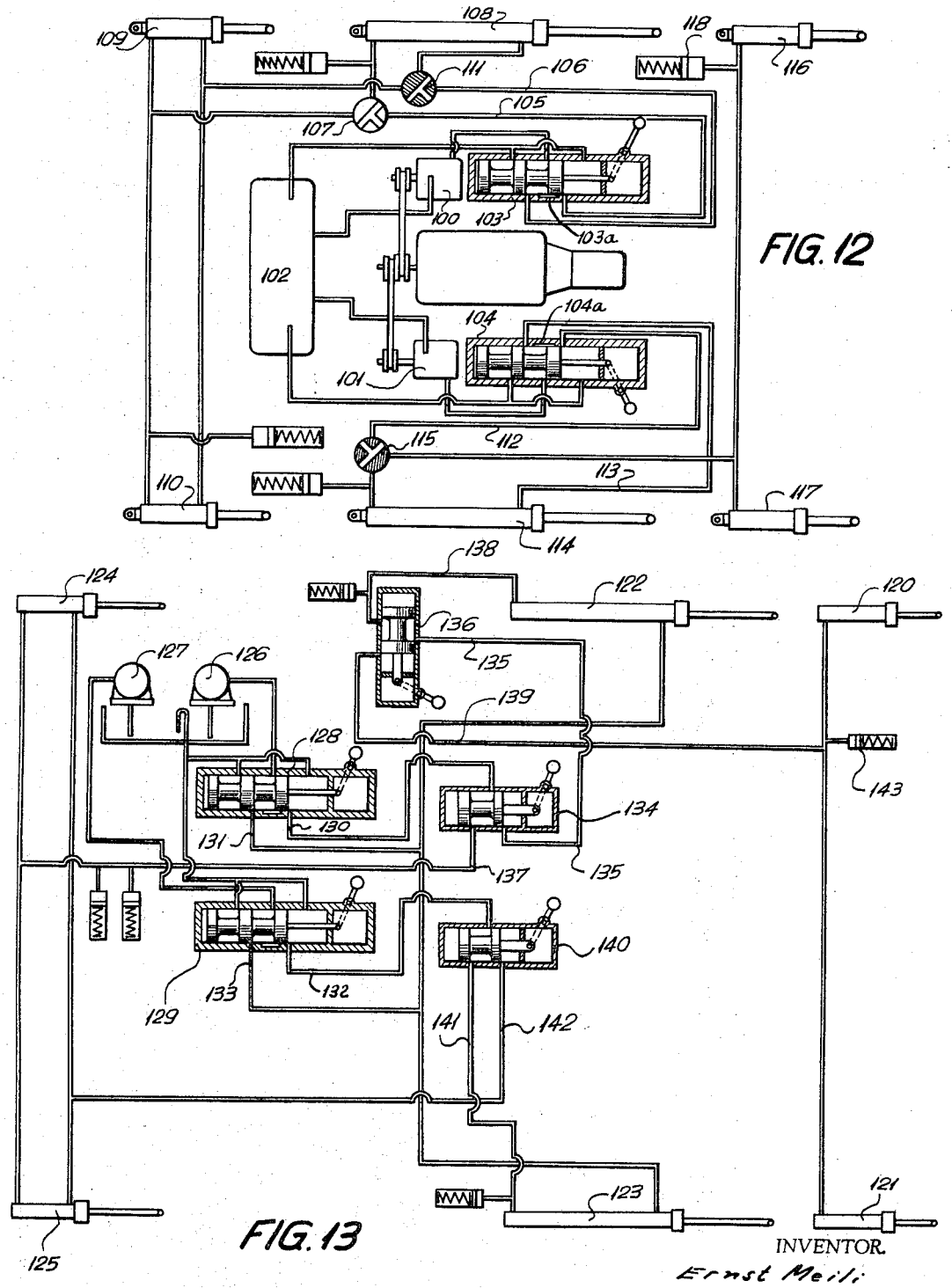

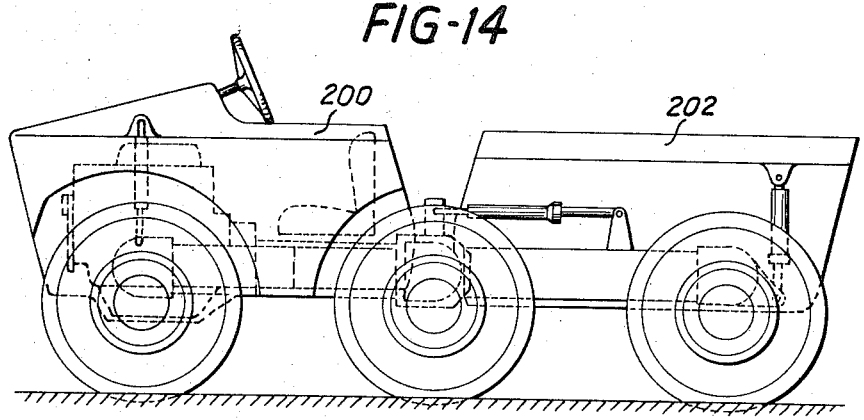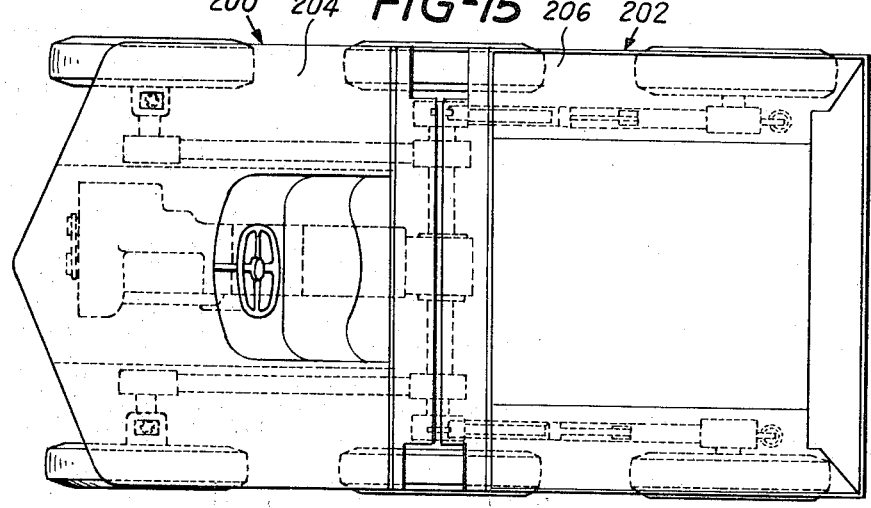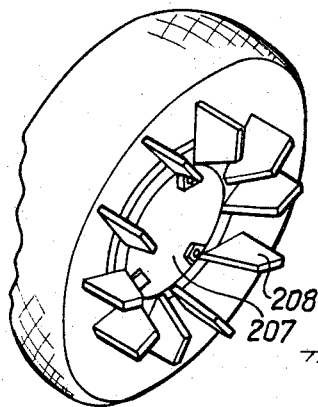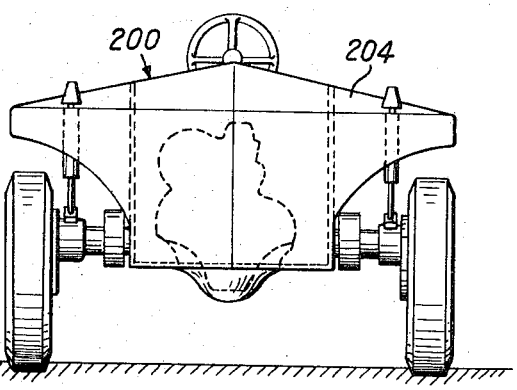

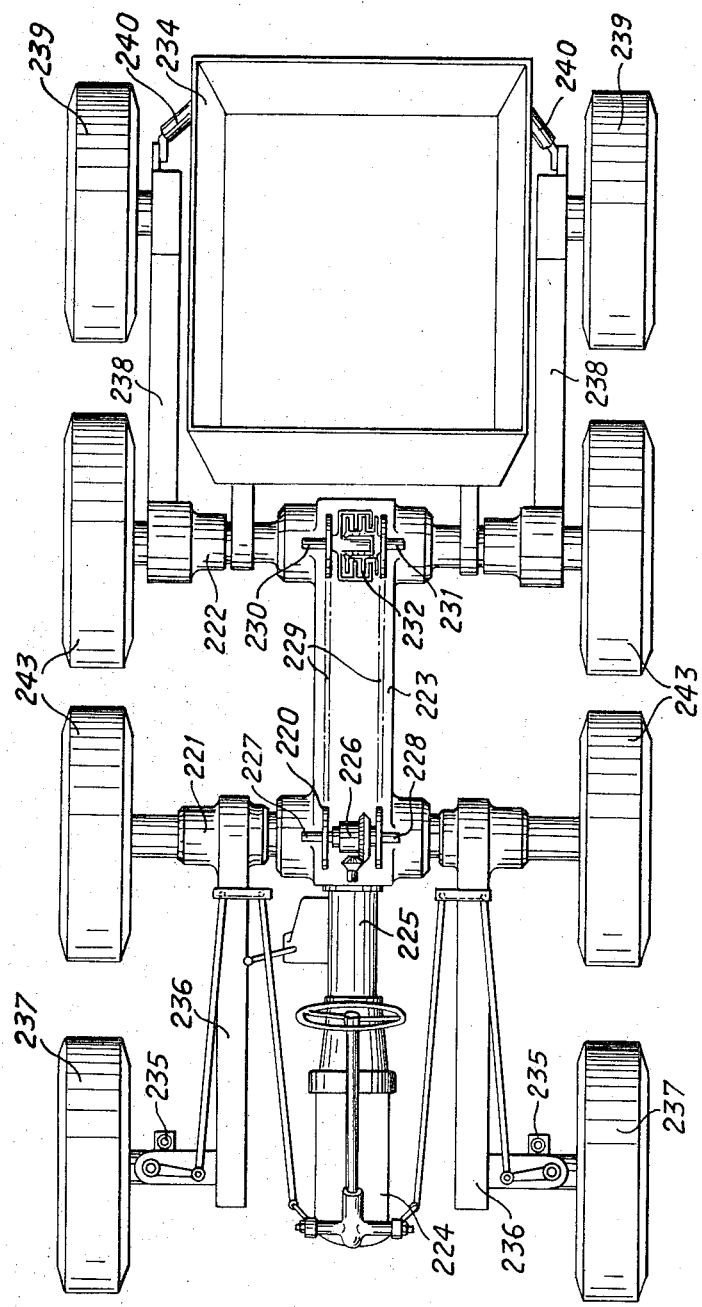

Nov. 7, 1967    E. MEILI    3,351,037
CROSS-COUNTRY MOTOR DRIVEN VEHICLES
Filed July 6, 1962    18 Sheets-Sheet 11
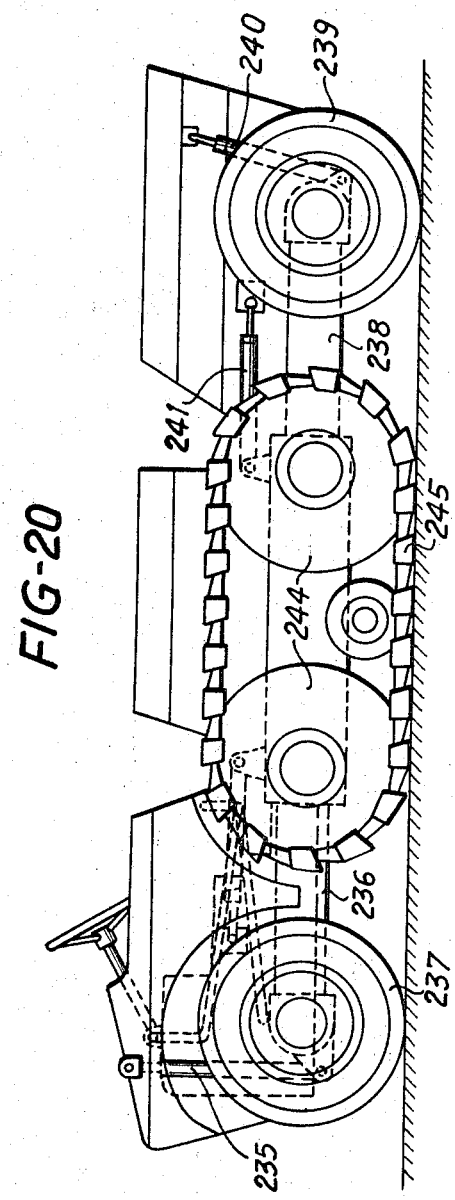
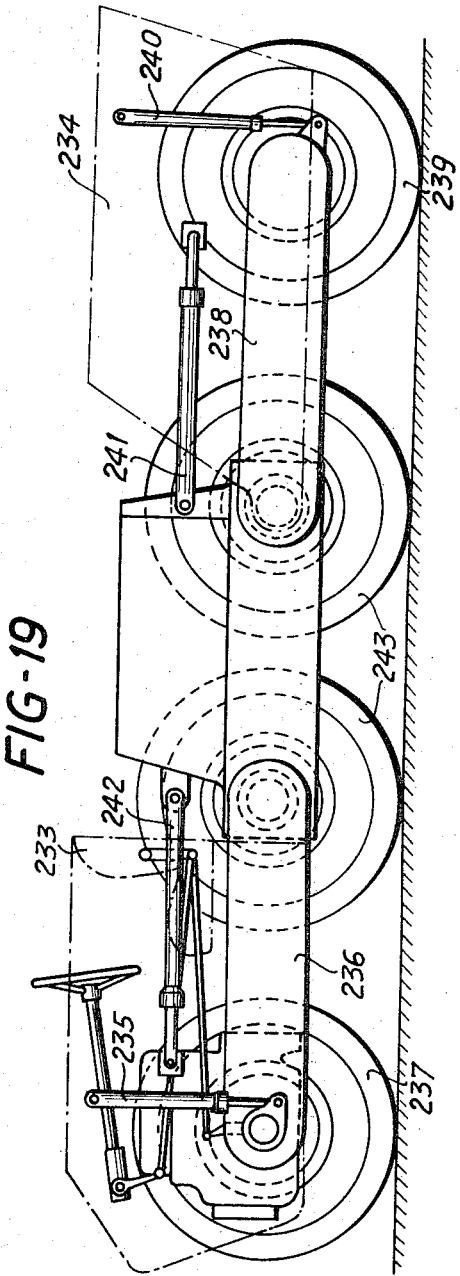
INVENTOR.
Ernst Meili
BY Nov. 7, 1967   E. MEILI   3,351,037
CROSS-COUNTRY MOTOR DRIVEN VEHICLES
Filed July 6, 1962   18 Sheets-Sheet 12

INVENTOR.
Ernst Meili
BY

Nov. 7, 1967    E. MEILI    3,351,037
CROSS-COUNTRY MOTOR DRIVEN VEHICLES
Filed July 6, 1962    18 Sheets-Sheet 13
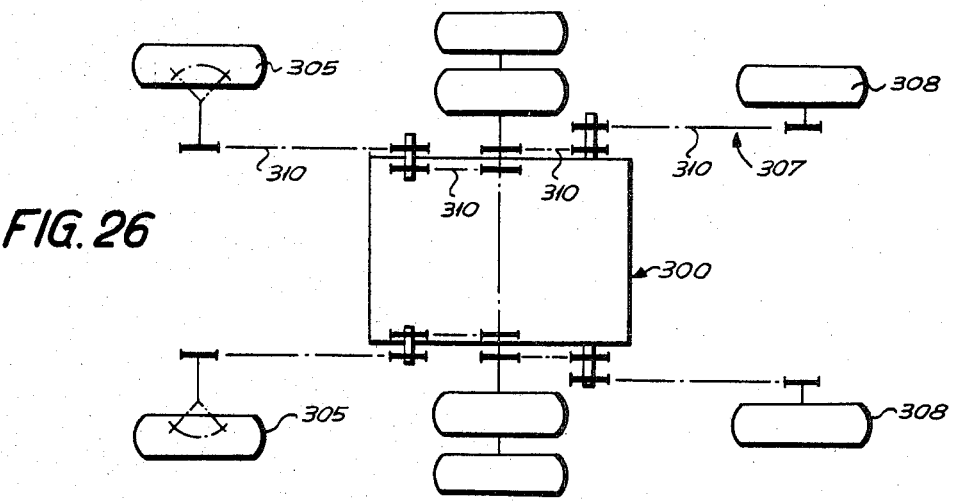
FIG.26
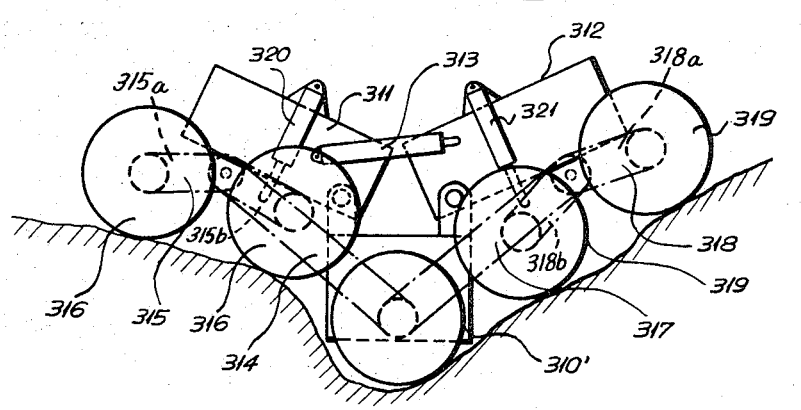
FIG.27
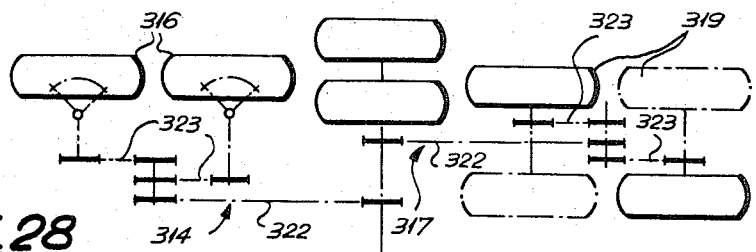
FIG.28
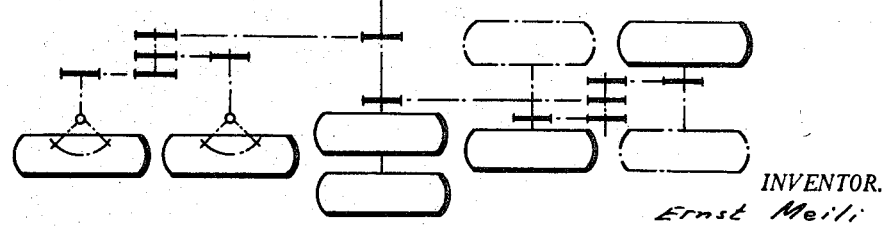
INVENTOR.
Ernst Meili
BY Nov. 7, 1967     E. MEILI     3,351,037

CROSS-COUNTRY MOTOR DRIVEN VEHICLES

Filed July 6, 1962     18 Sheets-Sheet 15

INVENTOR.
Ernst Meili
BY

Nov. 7, 1967   E. MEILI   3,351,037
CROSS-COUNTRY MOTOR DRIVEN VEHICLES
Filed July 6, 1962   18 Sheets-Sheet 16

INVENTOR.
Ernst Meili
BY

Nov. 7, 1967  E. MEILI  3,351,037
CROSS-COUNTRY MOTOR DRIVEN VEHICLES
Filed July 6, 1962  18 Sheets-Sheet 17
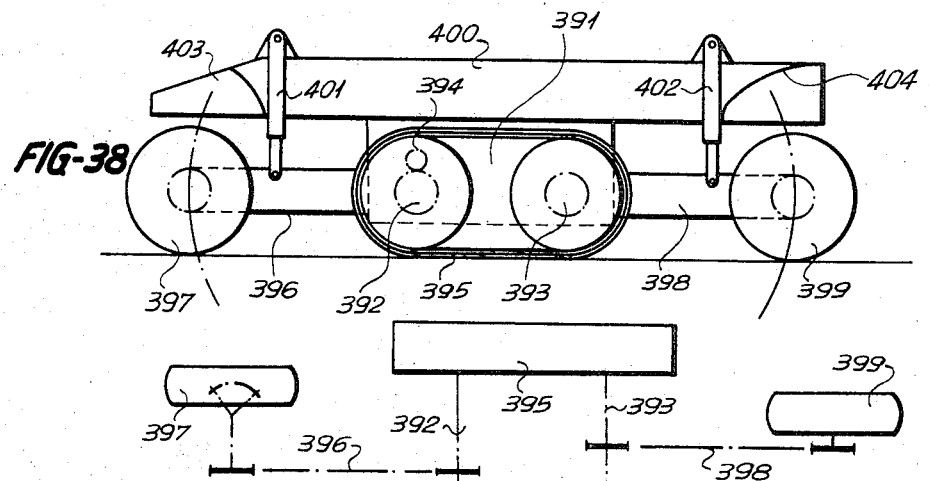
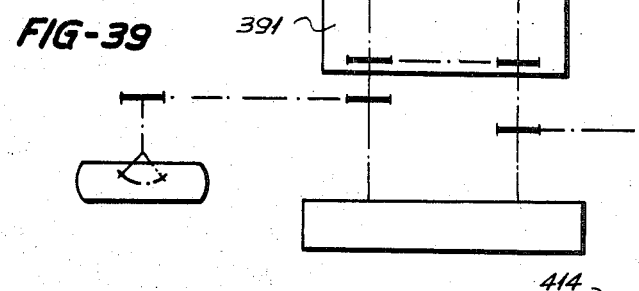
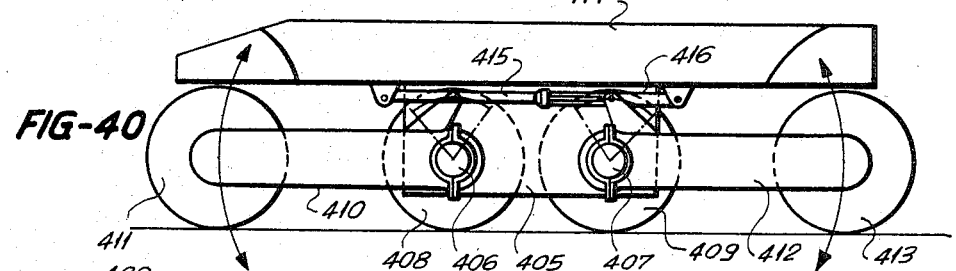
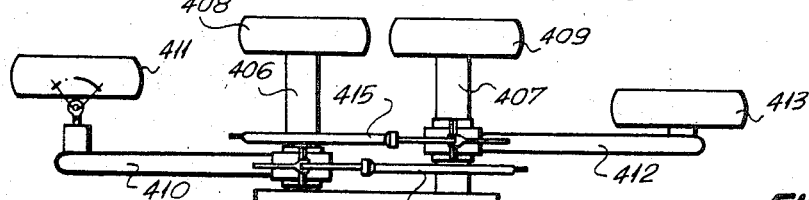
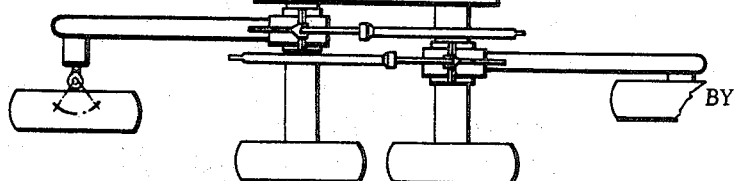
INVENTOR.
Ernst Meili
BY

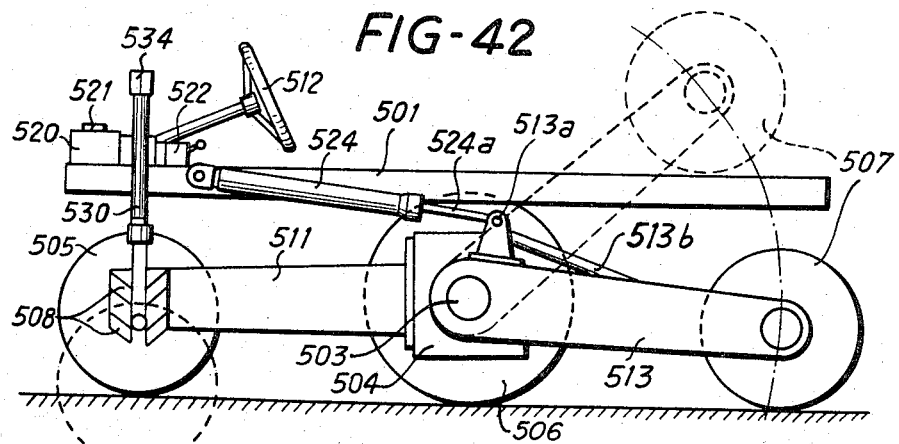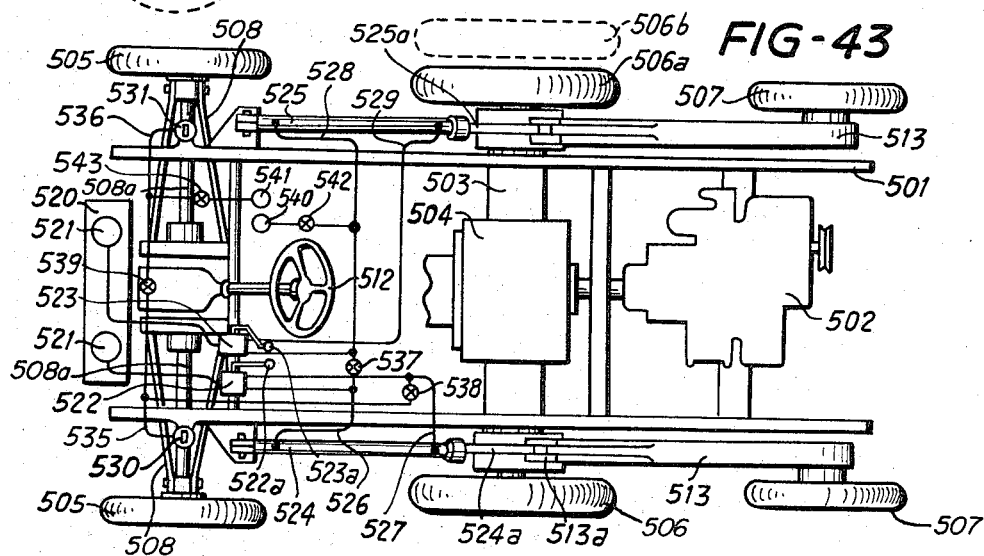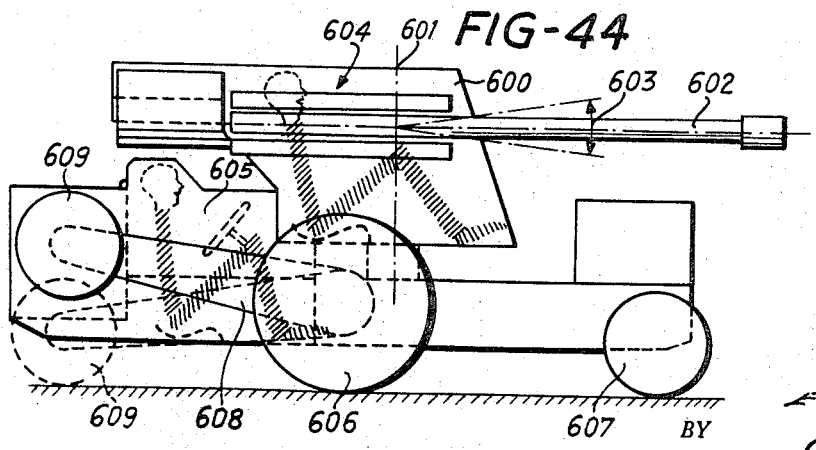

United States Patent Office 3,351,037
Patented Nov. 7, 1967

3,351,037
CROSS-COUNTRY MOTOR DRIVEN VEHICLES
Ernst Meili, Hochstrasse 129, Schaffhausen, Switzerland
Filed July 6, 1962, Ser. No. 207,994
Claims priority, application Switzerland, July 16, 1957, 48,460; Oct. 17, 1957, 51,698; Germany, June 18, 1959, M 41,865
30 Claims. (Cl. 115—1)

This application is a continuation-in-part of my co-pending applications, Ser. No. 748,853, filed July 16, 1958 and Ser. No. 837,715 filed Sept. 2, 1959, both of which have been abandoned.

This invention relates to ground vehicles, and particularly to vehicles that are highly flexible with regard to the manner in which they can conform to varying terrain and negotiate obstructions. Still further, the present invention relates to vehicles which are amphibian in nature in that they can be used as water vehicles or as ground vehicles. Still more particularly, the present invention relates to vehicles which are self-propelled as by embodying an engine or a driving motor.

Wheeled ground vehicles, such as trucks, are, of course, well known and generally comprise a chassis with two or more axles suspended therebeneath and carrying ground wheels. Such vehicles are quite adequate for the usual circumstances, but where extremely rough terrain is to be crossed, or where a truck is apt to encounter obstructions or the like, such vehicles are notably lacking in being able to cope with such situations.

Particularly, in connection with military vehicles, extremely difficult situations will be encountered where it will be essential for a vehicle to, for example, climb over a wall or the like. Still further, military vehicles are likely to spend as much time operating in extremely rough terrain, or in mud, or sand, and on hill sides as in any other circumstances.

With the foregoing in mind, the present invention proposes the construction of a motor driven vehicle which is adapted for coping with the several adverse situations referred to above.

A particular object of this invention is to provide a motor driven vehicle which can easily climb over walls and other obstructions.

A still further object of this invention is the provision of a vehicle of the type referred to which is adapted for driving laterally on inclined surfaces while the body portion of the vehicle can be maintained in a horizontal position.

It is also an object of this invention to provide a motor driven ground vehicle which has independent control of the wheels in the front and back and on opposite sides thereof.

A still further object of this invention is the provision of a motor driven ground vehicle having a plurality of axles with independent control of the elevation thereof so that the vehicle can be adjusted into either a humpback or a swayback configuration.

It is also an object of this invention to provide a motor driven ground vehicle having a plurality of axles in which abnormal tire scrub, which could be occasioned by all the wheels of the axles engaging a paved roadway, can be eliminated, by adjustment of the vehicle to a humpback configuration.

Still another object of this invention is the provision of a multiaxled ground vehicle, particularly, characterized in that it is extremely highly maneuverable.

It is also an object of this invention to provide a multi-axled ground vehicle in which all of the wheels can be driven in unison so that a high tractive effort is available when the vehicle is in mud or the like.

It is also an object of this invention to provide a multi-axled vehicle which when adjusted to a swayback configuration can be steered by applying brakes to either the left wheels or to the right wheels, independently.

FIGURE 9 is a transverse sectional view through the center axle somewhat modified from the center axle of FIGURE 6.

FIGURE 10 is a diagrammatic representation of one hydraulic circuit arrangement for controlling the wheel support arms of the vehicle.

FIGURE 10A is a sectional view showing the construction of one of the main valves of the hydraulic control circuits.

FIGURE 11 is a modified arrangement of the FIGURE 10 circuit.

FIGURE 12 is another hydraulic circuit similar to that of FIGURES 10 and 11 but providing for independent actuation of the motors that tilt or rotate the wheel support arms relative to each other.

FIGURE 13 is a modified arrangement of the circuit of FIGURE 12.

FIGURE 14 is a side view of a modification wherein the body portions include hollow buoyant parts so the vehicle will float in the water.

FIGURE 15 is a plan view of the FIGURE 14 modification.

FIGURE 16 is a front view of the FIGURE 14 modification.

FIGURE 17 is a perspective view showing a paddle attachment for the wheels for assisting in the propulsion of the vehicle in the water.

FIGURES 18 through 20 show a modified construction.

FIGURE 26 is a plan view thereof.

FIGURE 27 is a diagrammatic side view of still another modification.

FIGURE 28 is a plan view thereof.

FIGURE 38 is a side view showing a still further modification.

FIGURE 39 is a plan view of the modification of FIGURE 38.

FIGURES 40 and 41 are side plan views respectively of still a further modification.

FIGURES 42, 43 and 44 are views of still another modification.

Figure 1:
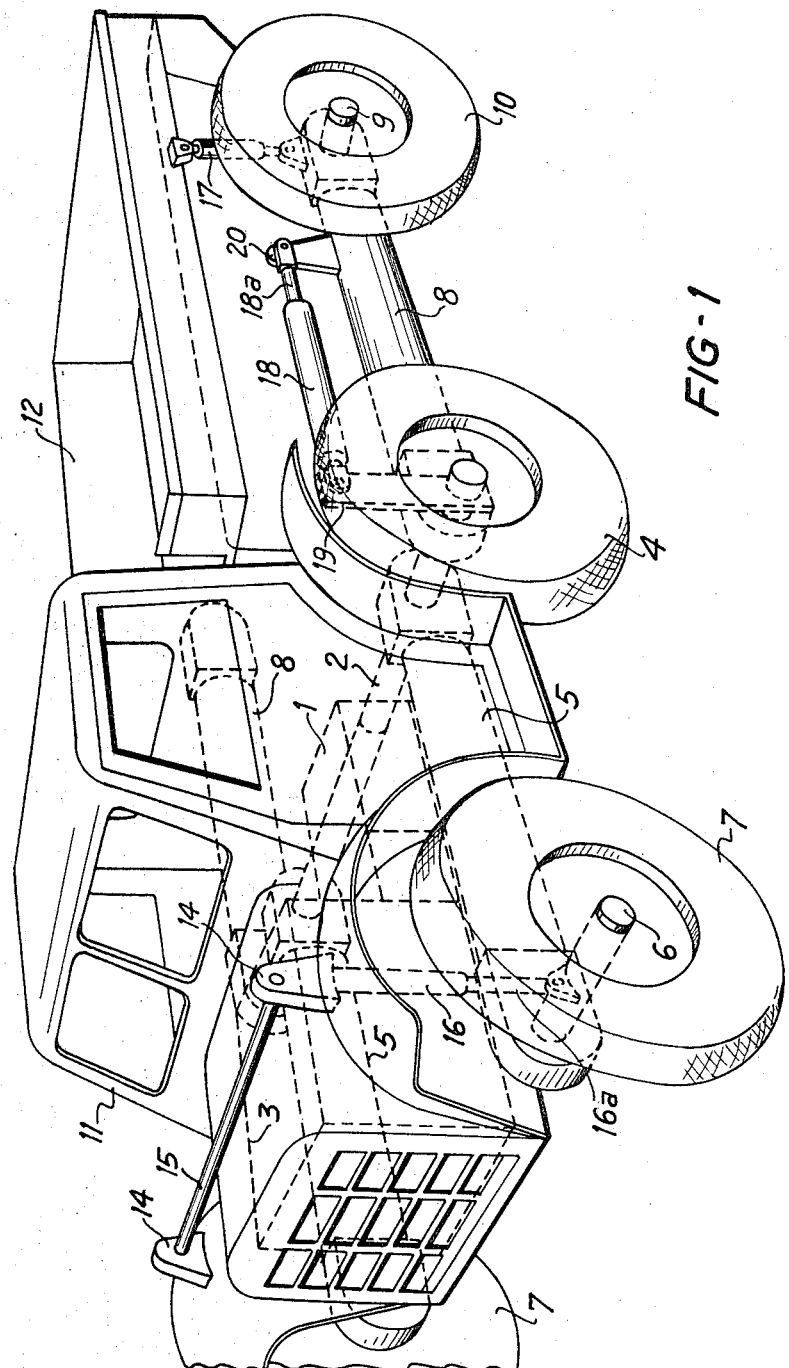
FIGURE 1 is a perspective, partly in phantom view of a vehicle according to the present invention.

In general, a vehicle according to the present invention comprises front and rear body sections and a center axle with wheels on the outer ends thereof. Extending both forwardly and rearwardly from this axle are wheel support arms that are pivoted to the axle and which carry wheels at their outer ends. These arms are independently pivoted to the said axle and, thus, are movable relative to each other.

The vehicle body portion at the front end of the vehicle is supported on the center axle structure and at its front end supports the outer ends of the forwardly extending arms by means of hydraulic motors so arranged that the front ends of the forwardly extending arms can be raised and lowered relative to the said body part.

A second rear body part has its front end pivotally supported on the center axle and its rear end supported on the rear ends of the rearwardly extending arms by hydraulic motors that can be employed for raising and lowering the rear arms relative to the rear body part.

Further hydraulic motor means are operatively connected between the front body and the rear arms which support the rear wheels, so that the front body and the rear body can be caused to assume an angle relative to each other with the vertex of the angle pointing either upwardly or downwardly thus imparting to the body either a humpback or a swayback configuration. These motors thus serve the purpose of causing articulation between the front and rear portions of the vehicle.

These articulation cylinders are also operative, in at least one modification, for laterally tilting the vehicle body so the vehicle can drive on an incline with the body held level.

The aforementioned arms are availed of for containing power transmission means for transmitting power from the center axle to the wheels at the outer ends of the arms so that all of the wheels of the vehicle are driven. The center axle includes a differential unit which, however, is capable of being locked up so that all of the six wheels referred to rotate as a unit; thereby providing extremely high tractive effort when the vehicle is in mud.

The center axle, of course, includes a non-rotatable housing to which the arms are pivoted and inside the housing is the rotatable axle shaft which is driven by the engine and, in turn, drives the wheels. The center axle may consist of a single axle or it may be a unit having two parallel axles so the center of the vehicle may have 2 center wheels on each side on an endless track tread thereon.

In the foregoing and in the following description, the motor arrangements that control the movements of the wheel supporting arms and those that control the tilting movements between the front and rear body sections are referred to, broadly, as fluid motors and it will be understood that, in practice, there are usually employed a plurality of piston cylinder arrangements because these are the most practical and easily constructed and the most easily controlled for the purposes of the present invention. However, the applicant does not wish to exclude the possibility of using other motor means that fall within the scope of the term "fluid motors."

Referring to the drawings somewhat more in detail, and, particularly, FIGURES 1 through 4 thereof, as will be seen, particularly, in FIGURE 1, there is a multispeed transmission 1 connected with the center axle 2 with there being an engine 3 associated with the transmission for transmitting power through the transmission to the axle 2. This is more or less conventional arrangement for transmitting power from a driving engine to a vehicle shaft. On the opposite ends of axle 2 are the wheels 4 which engage the ground. Axle 2, of course, includes a housing and a rotatable axle shaft therein.

Pivotally attached to the housing of axle 2 and extending forwardly therefrom are a pair of rigid arms 5 and which arms at their forward ends carry the laterally outwardly extending axles 6 which carry front wheels 7.

Also pivotally connected with the housing of axle 2 and extending rearwardly therefrom are rigid arms 8 having axles 9 extending laterally outwardly therefrom at their rear ends and carrying rear wheels 10. As will become more apparent hereinafter, the arms 5 and 8 are hollow and drivingly interconnect the front and the rear wheels with the wheels of axle 2 so that the front and rear wheels on each side of the vehicle are drivingly interconnected with the driven wheels of the center axle, and rotate in unison therewith.

The vehicle frame or body part comprises a front section 11 and a rear section 12. Front section 11 may comprise a housing for the engine and transmission and also includes a driver's compartment. Rear section 12 is the load carrying compartment.

Front section 11 of the vehicle body is stationary with respect to the engine and transmission and center axle unit and may be supported at its rear end on the housing of axle 2 while, at its forward end, there are the support brackets 14 that carry a transverse brace rod 15 between which rod, and the outer ends of arms 5, there are disposed the double acting hydraulic motors 16. These motors are adapted for being supplied with pressure for urging the outer ends of arms 5 upwardly or downwardly relative to the front body part.

Load carrying compartment 12 is somewhat differently arranged with its forward end pivotally supported on axle 2 and extending backwardly over the rear ends of rearwardly extending arms 8. Between a rear portion of body part 12 and a rear portion of arms 8 there are disposed the single acting hydraulic motors 17 which, when supplied with pressure, will urge arms 8 downwardly relative to body part 12, or, conversely, urge body part 12 upwardly relative to arms 8. The weight of the body will collapse the motors when the pressure is released.

Figure 2:
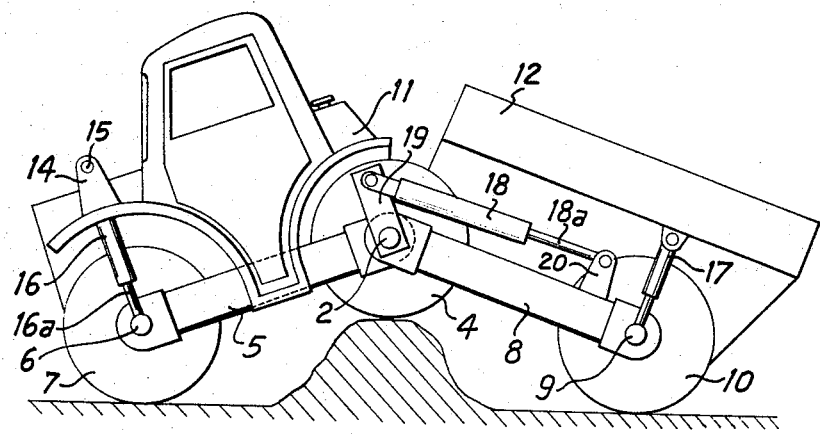
FIGURES 2 and 3 show the vehicle in side elevation in two operative positions thereof, namely, the humpback and swayback configurations, respectively.
Figure 3:
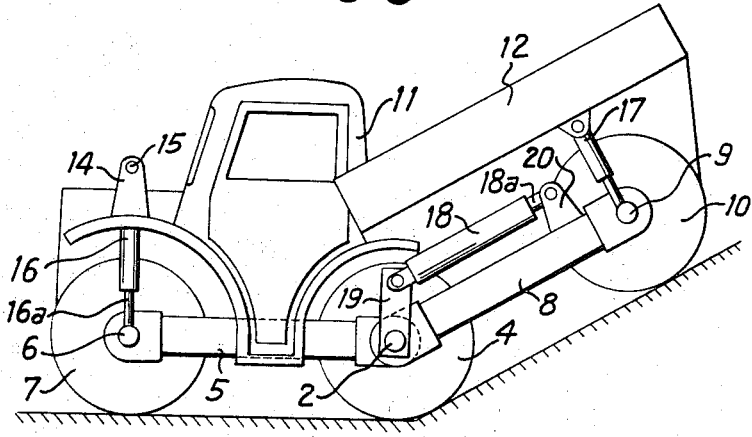

A particularly important feature of the present invention is in the arrangement for causing body parts 11 and 12 to assume an angle relative to each other. This can be an angle such that the vehicle is humpback as illustrated in FIGURE 2, or so that it is swayback as indicated in FIGURE 3. The means that accomplishes this consists of a fluid motor on each side of the vehicle indicated at 18.

In FIGURES 1, 2, 3, and 4, each motor 18 will be seen to have one part connected to a bracket member 19 rigid with one end of the housing of axle 2 and another part connected with a bracket 20 rigid with the adjacent of arms 8 at a point thereon spaced from axle 2. It will be evident that extension of cylinders 18 will cause arms 8 to be urged in a clockwise direction relative to axle 2 as viewed in FIGURE 2, so that the vehicle will assume a humpback configuration, whereas, contraction of the motors 18 will cause the arms 8 to be urged in a counter-clockwise direction relative to axle 2 so that the vehicle will assume the swayback configuration of FIGURE 3.

When the body section 12 is unloaded, the weight of the front section 11 of the body will cause the rear part to elevate when the motors 18 are retracted whereas, if the body part 12 is loaded, retraction of motors 18 will cause the front part of the body to lift. Thus, the loading of the vehicle will determine the particular manner in which the vehicle assumes its swayback configuration.

It will also be evident, from the foregoing description, that motors 18 can be considered to be operatively connected between the front and back body sections 11 and 12 and that one effect of the motors is to cause these body parts to assume a predetermined angle relative to each other. The motors 18, when operated to cause the body sections to tilt relative to each other, are operated in unison and the result is as indicated in FIGURES 2 and 3.

In other instances, when the vehicle is to be tilted laterally so that the vehicle body will be substantially level or horizontal while the wheels are following a lateral incline, one or the other of the motors 18 becomes effective for lifting the pertaining end of the center axle upwardly so that the center axle is held in a horizontal position, thereby holding the vehicle body level while the front and back wheels adapt themselves to the incline and support the weight of the vehicle because of the fact that the fluid in the left motor 16 is free to communicate with the right motor 16. In a like manner fluid in the left motor 17 is free to communicate with the right motor 17.

Figure 4:
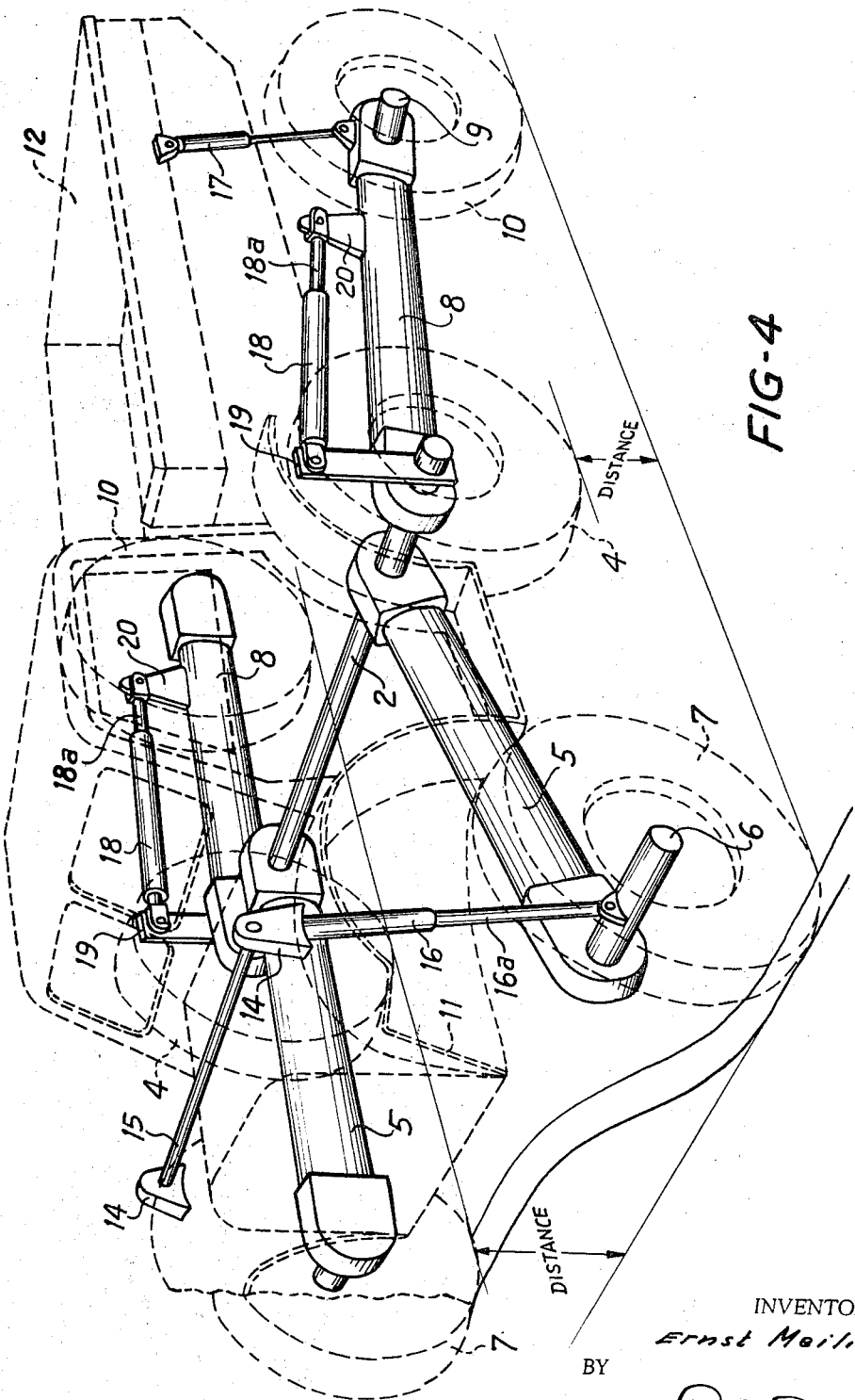
FIGURE 4 shows the vehicle on an incline with the wheel arms adjusted to hold the vehicle body level.

When the vehicle is to be adjusted to ride on an incline with the vehicle body level, the motors 18 connected between the bracket members 19 and the arms 8 are individually controlled, for example, only one thereof being operated. The vehicle, with the axles and the supporting arms therefor adjusted so that the vehicle body will ride level along an incline, is illustrated in FIGURE 4 wherein it will be seen that the one motor 18 is adjusted so that the arms on the same side of the vehicle assume a humpback configuration, whereas, the motor 18 on the opposite side of the vehicle is adjusted so that the arms on that side of the vehicle remain in a straight line. The hydraulic circuit of FIGURE 10 does not provide for independent actuation of these motors but it is provided for in the circuits of FIGURES 12 and 13.

It will be evident that the center wheel on the downhill side of the vehicle rides free of, or above, the ground while the vehicle is operated in this manner.

The center axle 2, the front body, the transmission, and the engine or drive motor form a substantially integral unit, and only with respect to tilting movements about a longitudinal axis, the rear body portion is also a portion of this unit. However, as mentioned before, the rear body is pivotally connected with the center axle to permit tilting movements of the body about the axis of the axle, which is, of course, a lateral axis.

Figure 5:
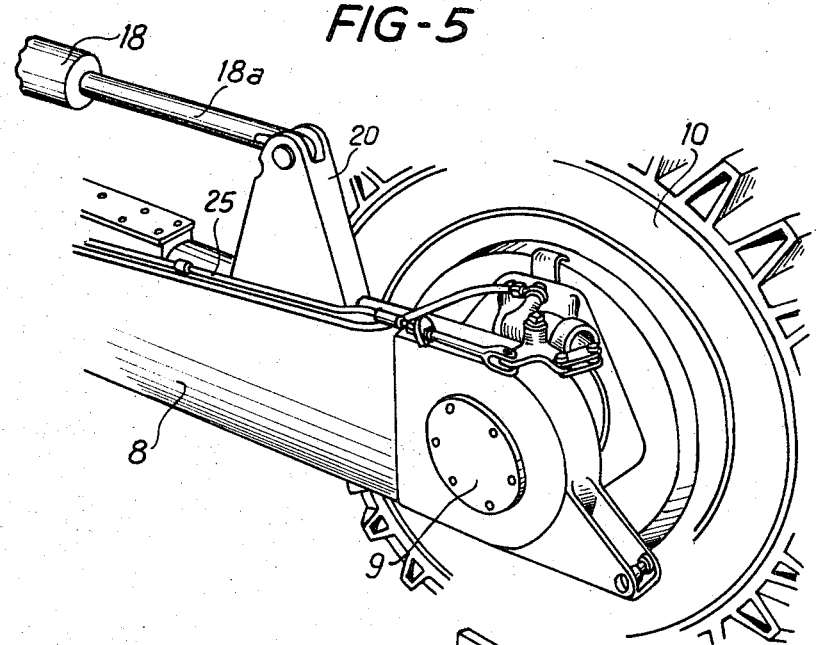
FIGURE 5 is a fragmentary perspective view of one of the back wheels and its supporting arm.
Figure 6:
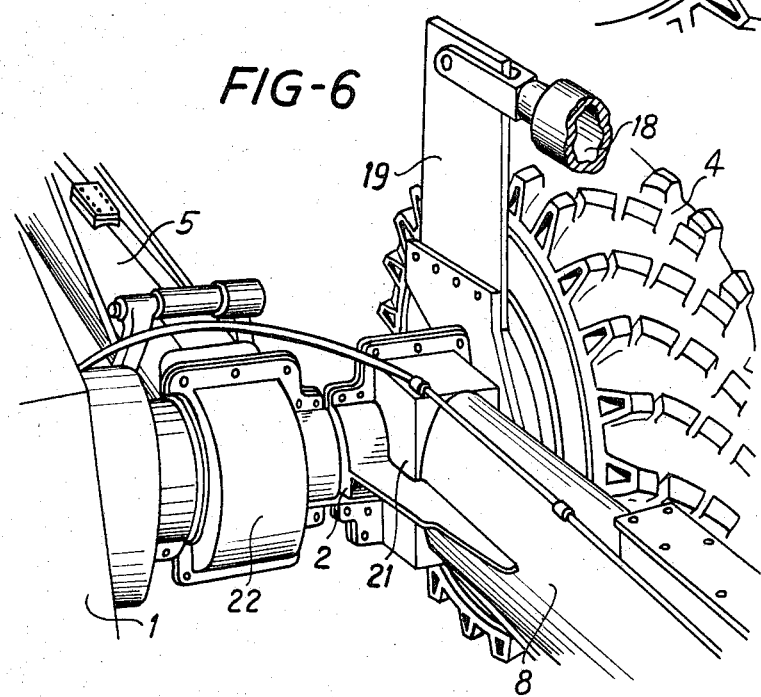
FIGURE 6 is a fragmentary perspective view of one end of the center axle structure.
Figure 7:
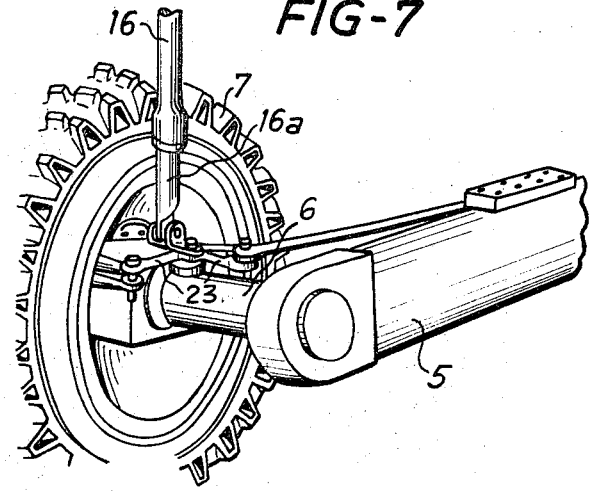
FIGURE 7 is a fragmentary perspective view showing a front wheel and its supporting arm.

With regard to specific details of construction of the vehicle, reference may be had to FIGURES 5 through 9. FIGURES 5 through 7 are perspective views of the modification of FIGURE 1. The details of FIGURES 8 and 9 pertain to a vehicle in which the centers of rotation of the wheels are disposed below the centers of rotation of the respective drive axle therefor, but, basically, the constructional arrangement of these figures is substantially the same as that pertaining to the FIGURE 1 modification.

FIGURE 5 shows a perspective view of one of the back wheels of the FIGURE 1 modification. This view shows the rear portion of arm 8, wheel 10, bracket 20 and motor 18 which has its piston rod 18a connected to bracket 20. Brake actuating means, such as mechanical or hydraulic lines 25, are provided for actuating brakes pertaining to the rear wheels and which brakes may be of a conventional nature.

FIGURE 6 shows a perspective view of one end of the center axle. This view shows the one center wheel 4, the forward end of arm 8, the rear end of arm 5, and to the left side, a portion of the transmission block 1. This view also shows that the forward end of each arm 8 is constructed in the form of a split bearing 21, the two halves of which are bolted about the axial housing of the center axle so that the rear arms are pivotally connected with the axle. Similarly, the rear end of arms 5 are in the form of split bearings 22 with the two halves thereof bolted about the housing of axle 2 so that the front arms are also pivotally connected with the center axle.

FIGURE 6 also shows the plate 19 which is rigid with the housing of axle 2 and extends upwardly therefrom for connection with the cylinder portion of motor 18 pertaining to the adjacent rearwardly extending arm 8.

FIGURE 7 illustrates somewhat diagrammatically and in perspective the front wheel arrangement wherein it will be seen the front wheel 7, its supporting axle 6, and the front end of supporting arm 5. The extendable fluid motor means 16 will be seen having its rod portion 16a connected to the axle structure 6. The front wheels are steerable and, to this end, have connected therewith a steering linkage 23 which may be of a more or less conventional nature except that there is no direct lateral connection between the front wheels on account of their individual vertical movement.

Figure 8:
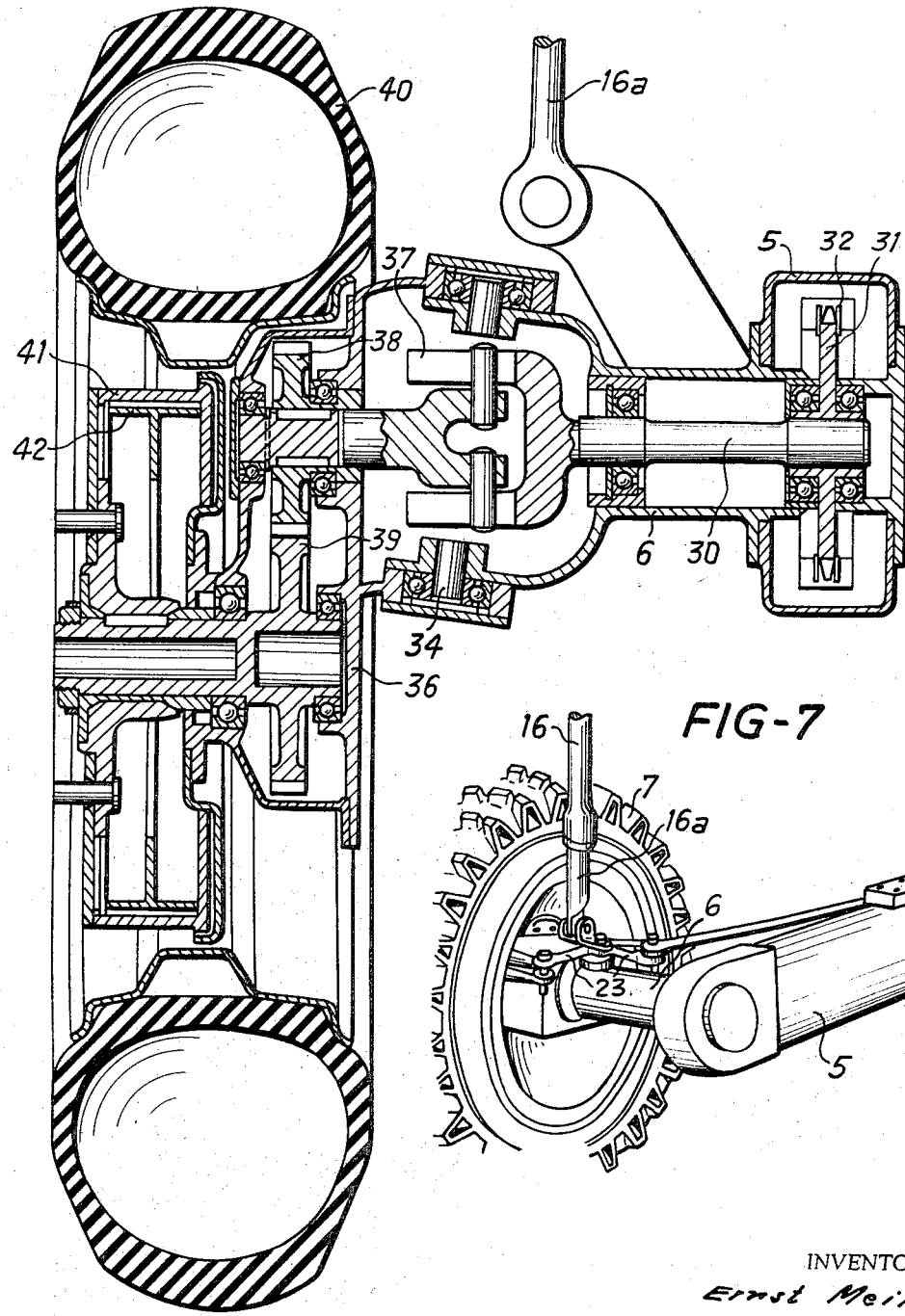
FIGURE 8 is a vertical sectional view through a front wheel somewhat as to structure from the front wheel arrangement of FIGURE 7.

It has been mentioned that all the wheels are driven and this is accomplished by extending power conveying means through the arms 5 and 8 from the center axle to the front and rear wheels. To permit this to be done, the arms are made hollow as will be seen in FIGURES 8 and 9. FIGURES 8 and 9 show a somewhat modified construction of the arrangement for driving the front and back wheels from the drive means in their respective supporting arms, but the hollow arms and the drive means therein and the wheels and axles are the same as the FIGURE 1 modification.

Reference to FIGURE 8, for example, will show that the rotatable portion of the front axle structure, said rotatable portion being indicated at 30, carries a sprocket 31 which is engaged by a drive chain 32. This drive chain extends longitudinally through housing 5, and as will be seen in FIGURE 9, passes about a sprocket 33 fixed to the rotatable portion 30 of the center axle. There is, of course, a drive chain for each of the front wheels.

Since the front wheels are steerable, they are arranged to pivot relative to their supporting axle structures. This is illustrated in FIGURE 8 by the axle pivots 34 which pivotally support the front wheel on the illustrated housing 6 of the front axle. As mentioned previously, the particular construction shown in FIGURE 8 is an arrangement wherein the axis of rotation of the shaft driven by drive means 32 is offset from the axis of rotation of the wheel and a step down transmission connects the wheel axle with shaft 30. The pivotal support of the front wheel on the front axle housing and the driving connection of the rotatable part 30 of the axle with the said rotatable part of the center axle by way of chains 32 is the same as is employed in connection with the modification of FIGURE 1.

In FIGURE 8, the front wheel is drivingly connected with the driven shaft 30 by the universal joint means 37 which drives a gear 38 that meshes with a gear 39 to which the wheel 40 is connected. The wheel structure includes a brake drum 41 and expansible brake means 42 therein.

The driving connection between the center axle and the rear wheels is substantially the same as described above except that, since the rear wheels are not steerable, there is no need for a pivotal support for the rear wheels or for a universal connection between the rotatable part of the rear axle and the rear wheels. As will be seen in FIGURE 9, each rearwardly extending arm 8 is hollow and there is disposed therein a drive chain 43 which passes about a sprocket on the rotatable axle of the pertaining rear wheel and also passes about a sprocket 44 fixed to the rotatable part 34 of the center axle.

FIGURE 9 shows a center axle corresponding to the front axle arrangement of FIGURE 8 in that the wheel 45 pertaining to the axle of FIGURE 9 is disposed below the center of the axle. In FIGURE 9, the wheel axle 46 is illustrated 90° out of its true position so that the details in connection with the driving thereof can be seen. In FIGURE 9, the driven part of the center axle at 34 carries a gear 47 that meshes with a gear 48 attached to wheel axle 46. The wheel structure of FIGURE 9 includes a brake drum 49 and brake shoe means 50 therein. The brake shoe means 50 of the wheels at opposite ends of the center axle means are preferably arranged for actuation independently or in unison according to well known practices.

As is customary with driven vehicle axles, the rotatable part of the center axle is divided so that the aforementioned rotatable part 34 is disposed on one side of transmission block 1 and another part 34a corresponding thereto is disposed on the opposite side of the transmission block. Each shaft 34 and 34a carries a bevel gear 51 forming a part of a differential unit which also includes a rotatable carrier 52 having therein bevel gears 53 meshing with aforementioned bevel gears 51.

The housing also carries a ring gear 54 that meshes with drive pinion 55 on the end of shaft 56 which is on the output shaft extending from the transmission block.

The above described differential unit is substantially conventional and provides for a differential movement between the wheels on opposite sides of the vehicle when the vehicle is turning a corner. The differential, however, can be locked up to prevent any relative movement between the left and the right wheels when necessary to drive the vehicle in mud, or in snow, or on ice.

The locking up of the differential unit prevents any relative movement between the wheels and all thereof rotate as a unit so that even if one set of wheels on one side of the vehicle completely loses its traction, the set on the other side of the vehicle will be driven. The locking up of the differential unit is accomplished by pin means 57 slidably mounted in carrier 52 and attached to a collar 58 that is normally spring urged to a first position by spring means 59.

In the first position of the collar 58, pin means 57 are withdrawn into the position in which they are illustrated in FIGURE 9. Upon movement of collar 58 toward carrier 52, however, pin means 57 engage teeth 60 formed about the back of one of the bevel gears 51 and, thus, lock this bevel gear to the carrier. The locking of the one bevel gear to the carrier, as is well known in the art of differential units and planetary gear systems, locks up the entire differential unit for rotation as a single integral unit and, thus, causes both of the axles 34 and 34a to rotate in unison regardless of the individual loads imposed thereon.

*Hydraulic circuit*

Reference now to FIGURE 10 will show one hydraulic circuit adapted for controlling the several fluid motors of the vehicle described above.

In FIGURE 10, there is a reservoir 62 to which a pump 63 is connected, and which pump supplies pressure fluid by a conduit 65 to a manually operated reversing valve 66 which is operable for selectively connecting conduit 65 with either of outlet conduits 67 or 68 while connecting the other thereof with exhaust conduit 69 leading back to the reservoir.

Located in conduits 67 and 68 are three-way valves 29. In one of the valves 29 is a port connected by conduit 70 with the lower ends of the double acting fluid motors 16 arranged between the front ends of the front set of wheel carrying arms and the front body portion thereabove. The other three-way valve is similarly connected by conduit 71 with the upper ends of fluid motors 16. The valves 29 are operable for selectively either supplying fluid to the motors 16 or entrapping fluid therein.

In this manner the front body portion is supported a predetermined distance above the front wheels, but since motors 16 are interconnected in parallel, this is a floating support, so that the individual front wheels can raise and lower relative to each other to follow the contour of the terrain to be traversed by the vehicle, while simultaneously positively supporting the front end of the front body portion.

Connected to the upper side of motors 16 which is subject to pressure on account of the load of the vehicle on the motors, is a resiliently expansible chamber 72 or spring loaded accumulator which provides a cushioning or shock absorbing effect.

The upper one of the aforementioned three-way valves 29 has another port connected by conduit 73 with the sides of the fluid motors 18 which will cause the said motors to collapse or shorten in length when hydraulic pressure is applied through conduit 73 while, simultaneously, conduit 74 is connected to exhaust. This collapsing or shortening of motors 18 will, as mentioned previously, urge the rear set of wheel supporting arms of the vehicle upwardly at their outer ends or counterclockwise relative to the center axle means when viewed from the right side of the vehicle.

The lower one of the three-way valves 29 in FIGURE 10 is connected by conduit 74 to the opposite or lower ends of motors 18 and, when hydraulic pressure is applied through conduit 74 to motors 18, the motors will be caused to extend or lengthen. Simultaneously, conduit 73 is connected to exhaust as by a mechanical connection between valves 29 to cause them to operate together. Three-way valves 29 are therefore used for connecting motors 18 to double-acting control valve 66 when cylinder operation is desired; or valves 29 may be operated to shut off the cylinder lines from valve 66 and thereby entrap the fluid in motors 18, provided that valve 77 is also closed.

Motors 18, similarly to motors 16, are connected in parallel so that fluid can pass between corresponding sides of the motors. Also, the end of motors 18 which is subjected to pressure on account of the load of the vehicle, is provided with a resiliently expansible chamber means or spring loaded accumulater 75, which is provided for a cushioning or shock absorbing effect.

Connected to conduit 74 is another conduit 76 leading to the fluid motors 17 which are disposed between the rear ends of the rear support arms of the vehicle and the rear body portion thereabove. These motors may be single acting, because of the following: When the rear end of the vehicle is elevated by means of collapsing or retracting motors 18, the cylinder rods 18a pull upward the two wheel support arms 8. Inasmuch as these two arms are then supporting the rear body there is no tendency to cause rear body support motors 17 to extend in length. (See FIGURE 1.) On the other hand, when the front end of the vehicle is elevated by means of collapsing or retracting motors 18, the motors 18 will act on the front body section rather than on the front wheel support arms 5. The front body section when thus elevated would then exert a pull on front body support motors 16 and tend to cause them to extend or lengthen because of the weight of the front wheels. However, front body motors 16 are purposely made double-acting to prevent them from extending during such an operation, thus allowing the front body and front wheels to elevate as a unit as the articulation motors 18 are being retracted.

Conduit 76 has therein a shutoff valve 77 so that fluid can either be supplied to or released from motors 17. Motors 17 are the rear body support motors. The valve 77 is normally shutoff. It is opened only when it is desirable to adjust the height of the rear body. Connected with fluid motors 17 is still another resiliently expansible chamber or spring loaded accumulator 78 to provide for a cushioning or shock absorbing effect.

Main valve 66 has a groove 66a therein by-passing the center spool of the valve member when the valve member is centered and by means of which conduits 67 and 68 can be interconnected when the valve spool is adjusted into a center position to interrupt communication between the pressure and exhaust conduits 65 and 69 and conduits 67 and 68. This is a "float" position, and by availing of valves 29, like or corresponding ends of the articulation motors 18 can be interconnected and isolated from the rest of the system. This is for the purpose of allowing the front and rear body sections of the vehicle to accommodate themselves to inequalities in the terrain being traveled upon. All six wheels are then free to "float" with the terrain.

With the spool of valve 66 in the position shown in FIG. 10a; the service conduits are, as mentioned above, blocked off from the pressure and exhaust lines and are interconnected by groove 66a. It will be evident that whenever the service conduits 67 and 68 disconnect from the pressure conduit 65, the discharge from the pump must be taken care of and for this reason there may be provided, in a conventional manner, one or more relief valves in the circuit to prevent the circuit pressure from exceeding a predetermined maximum allowable limit. Also, the valve member of main valve 66 preferably is so constructed that when it is in position to interrupt communication between the service conduits and the conduits 65 and 69, the pump delivery is bypassed to exhaust or back to the reservoir. This is a conventional provision in connection with hydraulic control valves. Also, if desired, the valve member in FIG. 10a could be moved to close off both service conduits by positioning the valve spool thereover and thus lock the fluid in the connected motors. It will also be understood that this same provision is made in the other hydraulic circuits to be discussed hereinafter, namely, that in the blocking off condition of any of the main valves, the pump delivery is bypassed back to the reservoir thereby relieving the pump discharge line of excessive pressures, while the relief valve means are provided wherever necessary in the circuit to limit the maximum circuit pressure.

The hydraulic circuit of FIGURE 11 is similar to that of FIGURE 10, but the valving arrangement is somewhat different.

In FIGURE 11 the right and left rear body support motors or piston cylinder arrangements are shown at 79 and 79a, respectively. The front right and left body support motors or piston cylinder arrangements are shown at 80 and 81, respectively, and the right and left articulation motors or piston cylinder arrangements are shown at 82 and 83, respectively. The supply pump is indicated at 84 and it supplies a main valve 85 from which leads pressure conduits 86 and 87. Pressure conduit 86 leads to a 3-way top auxiliary valve 88 having a normal position in which conduit 86 is connected to conduit 89 and having a forward position wherein conduit 86 is connected with conduit 90 leading to the lower ends of the front body support cylinders.

Conduit 87 leads to a lower auxiliary valve 91 having a normal position in which conduit 87 is connected with conduit 92 leading to the right ends of articulation cylinders 82 and 83. Lower auxiliary valve 91 has a forward position in which conduit 87 is connected with conduit 93 leading to the upper ends of the front body support cylinders 80 and 81.

Conduit 93 has connected therewith the resiliently expansible chamber or spring loaded accumulator 94.

The aforementioned conduit 89 leads to a rear auxiliary valve 95 having a normal position wherein conduit 89 is connected with conduit 96 leading to the left ends of articulation cylinders 82 and 83.

Valve 95 has a shifted position wherein conduit 89 is connected with conduit 97 leading to the rear body support cylinders and this last mentioned conduit has a resilient expansible chamber or spring loaded accumulator 98 connected therewith.

The operation of the circuit of FIGURE 11 is quite similar to the operation of the circuit of FIGURE 10 except that an additional valve is involved. This circuit is also arranged so that substantially all operations are carried out by shifting of the main valve 85, depending upon the settings of the auxiliary valves. For example, for raising and lowering the front body, the top and lower auxiliary valves 88 and 91 are moved to their shifted positions, and the front body can then be raised and lowered by manipulation of the main valve 85. For rear body operation, the upper and lower auxiliary valves 88 and 91 are placed in their normal positions and the rear auxiliary valve 95 is shifted to the right, wherein conduit 89 is connected with conduit 96, whereupon the operation of the main valve will cause raising or lowering of the rear body portion.

For manipulation of the articulation motors 82 and 83, all of the auxiliary valves occupy their normal positions and the main valve effects control of the articulation motors.

Main valve 85 also has a "float" position provided by groove 85a wherein the service conduits 86 and 87 are interconnected while the pressure and exhaust conduits are blocked off. The main valve provides for by-passing the pump delivery to the reservoir when the pressure conduit is blocked off and, as is customary with hydraulic circuits, relief valve means are provided to limit peak pressures in the system.

FIGURES 12 and 13 show additional hydraulic circuits in which the articulation cylinders, 108 and 114 in FIGURE 12 and 122 and 123 in FIGURE 13, can be individually controlled, whereby tilting of the vehicle body can be had.

Referring first to FIGURE 12, there are two pumps 100 and 101 which draw fluid from a reservoir 102 and discharge fluid to the pressure ports of the two main control valves 103 and 104. Main valve 103 is movable to connect the pressure line from pump 100 to either of conduits 105 or 106 while exhausting the other.

Conduit 105 leads to a 3-way valve 107 having one port connected with the left end of the right articulation cylinder 108 and having another port connected with the upper end of the front body support cylinders 109 and 110.

Conduit 106 is connected with another 3-way valve 111 having a port connected with the right end of right articulation cylinder 108 and having another port connected with the lower ends of the front body support cylinders 109 and 110.

It will be evident that the movements of the front body support cylinders and of the right articulation cylinder 108 are entirely under control of the 3-way valves 107 and 111. These valves provide means for entrapping fluid in these cylinders and, further, the right hand articulation cylinder 108 can be operated entirely independently of the one on the opposite side.

Pump 101 supplies pressure fluid to valve 104, which in turn, connects the pressure conduit with conduit 112 or conduit 113. Conduit 113 leads directly to the right end of left hand articulation cylinder 114, whereas conduit 112 leads to a 3-way valve 115, which has a port connected with the left end of the articulation cylinder 114 and another port connected with the rear body support cylinders 116 and 117, respectively.

The left ends of the articulation cylinders, the upper ends of the front body support cylinders, and the rear body support cylinders all have the resiliently expansible fluid chamber means or accumulators 118 connected therewith.

The main valve 104 and the 3-way valve 115 provide means for controlling the rear body support cylinders 116 and 117 and for entrapping fluid therein and for reversibly supplying fluid to articulation cylinder 114 and entrapping it therein, and also provide for independent actuation of cylinder 114 apart from the actuation of cylinder 108.

Each of valves 103 and 104 also includes a by-pass or "float" position in which the service conduits 105 and 106 for value 103 or conduits 112 and 113 for valve 104 interconnected by grooves 103a and 104a, respectively. The valves also have a position where these conduits are blocked and other positions where they are alternately connected with pressure and exhaust. Valves 103 and 104 also include means for bypassing fluid from the pump back to the reservoir during the periods when cylinders are not actuated. In addition, relief valve means is provided to limit system pressure, for example, should the operator operate a valve to actuate a cylinder to its extreme piston travel the relief valve would then open.

FIGURE 13 shows a system somewhat similar to that of FIGURE 12, but modified in the same manner as the modification of FIGURE 11 over that of FIGURE 10.

In FIGURE 13, the right and left hand rear body support cylinders are indicated at 120 and 121, respectively. The right and left hand articulation cylinders are indicated at 122 and 123, respectively, and the right and left hand front body support cylinders are indicated at 124 and 125, respectively.

There is provided an upper pump 126 and a lower pump 127. Upper pump 126 has a pressure line leading to the inlet of a right main valve 128, and a lower pump 127 has a pressure line leading to the inlet of a left main valve 129. The right main valve has two service conduits 130 and 131, and the left main valve has two conduits 132 and 133. Each main valve is shiftable for connection of either of its service lines to the pressure line, while connecting the other to exhaust or is shiftable for blocking the two service lines or is shiftable into a position where the two service lines are interconnected for a "float" position.

At this time the supply and exhaust lines are open to each other. Also usually, on a valve of this type, when the cylinder is allowed to "float," the pressure supply line from the pump is open to the tank return or exhaust line. This type of valve is shown in FIG. 10a and has previously been described.

Service line 130 leads to a port in a right auxiliary valve 134 which has a normal position wherein conduit 130 is connected with a conduit 135 leading to a rear body auxiliary valve 136. Valve 134 has a forward or shifted position wherein conduit 130 is connected with conduit 137 leading to the upper ends of the right and left hand front body support cylinders 124 and 125.

The rear body auxiliary valve 136 has a normal position wherein conduit 135 is connected with conduit 138 leading to the left end of the right hand articulation cylinder 122. This valve has a shifted or left hand position wherein conduit 135 is connected with conduit 139 leading to the right and left hand rear body support cylinders 120 and 121.

The other service conduit leading from valve 128, identified by the reference numeral 131, leads directly to the right hand ends of both of the right and left hand articulation cylinders 122 and 123. This conduit 131 is also connected with service conduit 133 leading from the left main valve 129.

The reason for connecting conduit 131 with conduit 133 is that this prevents any inequality in pressure being present at the right hand ends of cylinders 122 and 123. Otherwise, due to the fact that two separate pumps and valves are used, pressures might be sufficiently variant to cause a certain amount of binding and loss of power when the articulation cylinders are retracted to obtain the "swayback" posture. The conduits at the left ends of the cylinders cannot be similarly connected together because of the requirement for tilting the vehicle on a side slope. However, a certain amount of binding can be tolerated during extension of the cylinders 122 and 123 because the effective piston area in the cylinder is larger on the left piston face than on the right piston face where the piston area is reduced by the area of the piston rod.

Turning now to the left main valve 129 service line 132 thereof leads to a left auxiliary valve 140 which has a normal up position in which conduit 132 is connected with conduit 141 leading to the left end or left hand articulation cylinder 123. This valve also has a shifted or forward position in which conduit 132 is connected with conduit 142 leading to the lower ends of the left and right hand front body support cylinders.

As before, the several cylinders have the resilient expansible fluid chambers or accumulators 143 connected therewith for shock absorbing and cushioning purposes.

The arrangement of FIGURE 13 also permits manipulation of the vehicle by means of the main valves.

The articulation cylinders 122 and 123 have selective control of the fluid supply thereto with respect only to the left ends thereof, but this is ample to provide for selective positioning thereof because the weight of the vehicle is acting on the cylinders in one direction.

When operating the vehicle to obtain either "swayback" or "humpback" posture or for "float," both main valves are operated together. For tipping the vehicle on a side slope, one main valve is operated to "humpback" while the other is operated to "float." For operating the articulation cylinders, the three auxiliary valves are placed in their normal positions and the articulation cylinders are then controlled directly from the main valves. For front body operation the left and right auxiliary valves are moved to their shifted or forward positions, the left main valve is placed in its bypass or float position, and the right main valve can then be shifted to supply fluid to the front body cylinders to raise the front body. The front body is lowered by placing the right main valve in a bypass position and shifting the left main valve.

For rear body operation, the right and left hand auxiliary valves are in normal position and the rear body auxiliary valve is shifted to its left hand position, and the rear body is then raised and lowered by manipulation of the right main valve.

For tipping the truck to the left, the front and rear body parts are lowered about halfway, the three auxiliary valves are placed in normal position, and the left main valve is placed in its float or bypass position, and the right main valve is then moved into position to supply pressure to conduit 130.

For tipping the truck to the right, the right main valve is placed in its bypass or float position and the left main valve is moved into position to supply pressure to conduit 132.

By the foregoing, it will be seen that complete control of all the movements of the vehicle can readily be accomplished by the hydraulic arrangements illustrated.

The vehicle described hereinbefore is thus provided with means whereby it can follow the contour of substantially any terrain over which it must be driven. By putting the articulation cylinders in float position, the front and back parts of the vehicle become flexibly interconnected so that they can raise and lower freely relative to each other in following the contour of the terrain.

At the same time the articulation cylinders can be energized so as to lift the front end of the vehicle so that it will "step" up on a raised surface, such as a wall or the like, so the vehicle can be maneuvered over such abutments up to a certain height.

For operation of the vehicle on a paved highway, it is of advantage to energize the articulation cylinders so as to lift the center wheels from the pavement, thereby reducing tire drag, and providing better conditions for manipulating the vehicle by way of its steerable front wheels.

An advantage that is obtained by the articulation cylinders is realized when the articulation cylinders are energized so as to tend to lift the front and rear wheels to be reduced substantially, with most of the vehicle weight transferred to the center wheels. With the articulation cylinders adjusted in this manner, extremely short turns can be made by individually actuating the brakes of the left or right wheels. Such braking arrangements, are, of course, known in connection with tractors and the like, and, accordingly, no specific showing of any means for individually actuating the left or right wheel brakes has been made.

FIGURE 10A shows a typical main valve arrangement that could be utilized in any of the several hydraulic circuits described. The particular valve illustrated is the valve 66 of FIGURE 10, but substantially the same main valve would be employed for the circuits of FIGURES 11, 12 and 13.

In FIGURE 10A it will be observed that the valve member, indicated at 66b, has a central bore 66c extending from end to end thereof, and that there are also laterally extending bores 66d, 66e, and 66f provided in the spools of the valve member. When the valve member is in its center position, the aforementioned central bore and lateral bores interconnect the pressure supply line 65 with the exhaust conduit means 69, thus bypassing the pump back to the tank or reservoir. At the same time the groove 66a interconnects the service conduits 67 and 68 for "float" operation.

*Modification of FIGURES 14 THROUGH 17*

FIGURES 14 through 17 show a vehicle substantially identical with the one above described and having the same hydraulic auxiliaries but in the case of the FIGURES 14 through 17 modification, the front body part 200 and the back body part 202 are boat-like in construction so that the vehicle has sufficient buoyancy to support it even when driven into the water. This is accomplished by forming a portion of the front body as at 204 and portions of the rear body at 206 so as to define air compartments that provide for the buoyancy effect.

The FIGURES 14 through 17 modification also shows the axes of rotation of the individual wheels disposed beneath the axes of rotation of their respective driving shafts in the outer ends of their arms as has already been illustrated and described with reference to axles 46 and 34 in FIGURES 8 and 9.

When the vehicle is adapted for operation in the water, there may be provided a plurality of adapter devices 207 which have a plurality of paddles 208 thereon. These adapter devices can be bolted to the wheels of the vehicle and will serve to propel the vehicle when it is in the water. However, the tires alone will propel the vehicle in the water and the front wheels will act as a rudder when turned. Also selective braking of the wheels on the opposite sides of the vehicle will cause turning of the vehicle in the water.

*Modification of FIGURES 18 THROUGH 20*

FIGURES 18 through 20 illustrate a somewhat modified arrangement wherein the center axle means 220 consists of a forward axle portion 221 and a rearward axle portion 222 rigidly interconnected by a portion 223. The engine 224 and transmission block 225 are connected to the center axle means in the front and the front axle portion 221 has therein differential unit 226 that drives the rotatable portions 227 and 228 of the front axle portion of the center axle means. The connecting portion 223 has drive chains 229 therein connecting the rotatable portions of the rearward axle 222, said portions being indicated at 230 and 231, with the corresponding rotatable portions 227 and 228 of the forward axle. A clutch 232 is included in the rearward axle, for drivingly interconnecting the two axle portions so as to make differential unit 226 ineffective. This is provided for the same purpose as the differential lock described in connection with FIGURE 9.

The vehicle of FIGURES 18 through 20 includes a front body portion 233 and a rear body portion 234. The front body portion 233 is connected at the rear with the center axle means and has fluid motors 235 supportingly interconnecting the front body portion with the forward ends of the forwardly extending arms 236. Arms 236 at their rear ends are pivotally supported on the center axle means and at their front ends carry the steerable front wheels 237.

There is similarly arranged at the rear of the vehicle, two rearwardly extending arms 238 pivoted at the front ends to the center axle means and carrying at the rear ends the rear wheels 239. Fluid motors 240 supportingly interconnect the rear ends of arms 238 with the rear end of rear body portion 234.

Inasmuch as the front and rear body parts on the FIGURES 18 through 20 arrangement are separately connected to the center axle means, it becomes advantageous to provide articulation cylinders 241 connected between the center axle means and the rear body part and also to provide articulation cylinders 242 connected between the center axle means and the front body part. The front articulation cylinders can be made effective by pivotally connecting motor 224 and transmission block 225 with the center axle means. This can readily be accomplished because the differential unit 226 would permit pivotal movement of the engine and the transmission block about the axis of the forward axle 221 of the center axle means without in any way disturbing the driving relation between the engine and the center axle means.

As in the previous modifications arms 236 and 238 are hollow and drive means extend therethrough to connect the front and back wheels drivingly with the center wheels of the vehicle.

The arrangement shown in FIGURE 20 is the same as that shown in FIGURES 18 and 19 except that in FIGURE 20 the center wheels 243 of FIGURES 18 and 19 take the form of wheels 244 adapted for drivingly supporting endless track means 245. In all other respects the FIGURE 20 arrangement can be considered the same as that illustrated in FIGURES 18 and 19.

Figure 21:
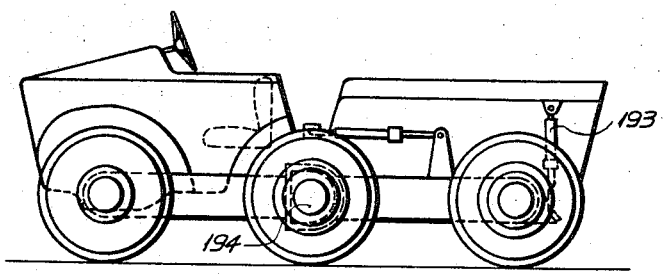
FIGURE 21 is a side view of a modified arrangement.
Figure 22:
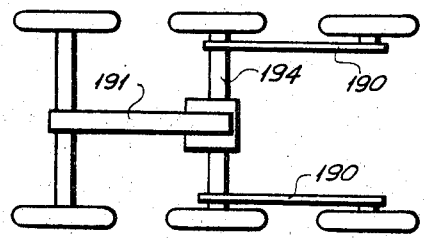
FIGURES 22 and 23 are more or less diagrammatic plan views of modifications according to FIGURE 21.

FIGURES 21 and 22 show an arrangement wherein the vehicle has front and back body sections with a center axle means 194. The rear body section is supported by fluid motors 193. The FIGURES 21 and 22 arrangement is particularly characterized in that a single arm 191 extends forwardly from center axle 194 while there are two arms 190 extending rearwardly from the center axle.

Figure 23:
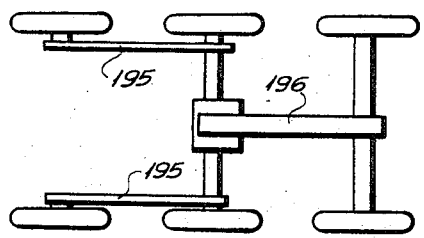

In FIGURE 23 it will be seen that the forwardly extending arms could consist of a spaced set of two arms 195 with the rearwardly extending arms consisting of a single arm 196. The arrangement is exactly the same as that of FIGURE 22 with this exception.

Figure 24:
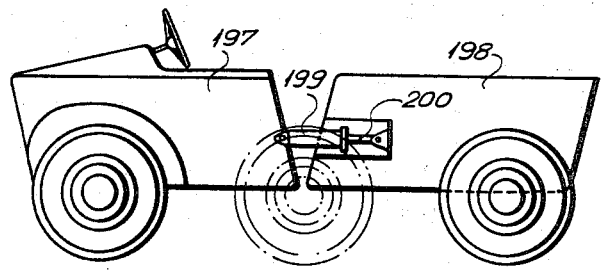
FIGURE 24 is a more or less diagrammatic view showing a still further modified arrangement wherein there is a single articulation motor connected between the front and back sections of the vehicle and located in about the vertical plane of the longitudinal axis of the vehicle.

In the modification of FIGURE 24 it will be seen how a single fluid motor or a pair of parallel acting fluid motors can be connected between a front body section 197 and a back body section 198. In this view, one fluid motor is represented by the cylinder 199 and is connected to one of the body sections and the double acting ram 200 reciprocably mounted in the cylinder and connected to the other body section.

This arrangement will give free floating of the front and back body sections relative to each other and can be employed for putting the vehicle into a humpback or swayback configuration but it is not adapted for adjusting the vehicle for operating on inclines as is the case where independent arms are employed on each side of the vehicle.

Figure 25:
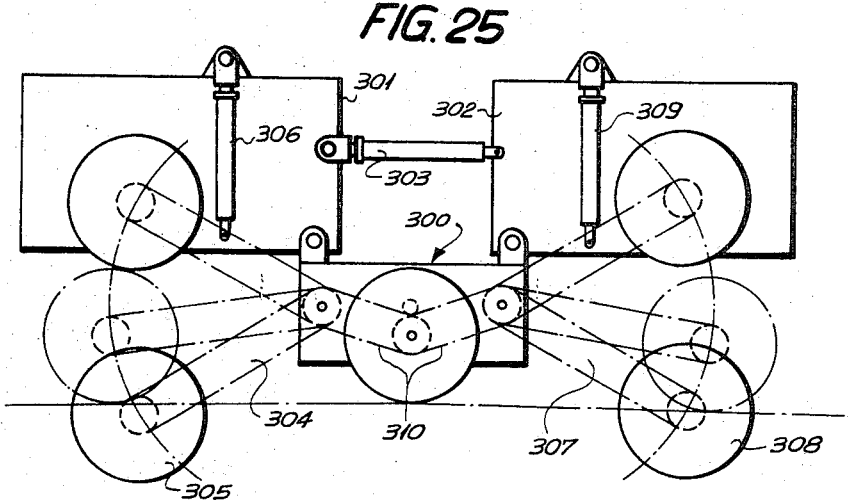
FIGURE 25 is a more or less diagrammatic side view of a modified arrangement of the invention.

FIGURE 25 shows somewhat diagrammatically an arrangement in which there is a drive wheel unit indicated generally at 300 and pivoted to which is a front body section 301 and a rear body section 302 connected by one or more articulation piston-cylinder arrangements 303. Extending forwardly from the driven axle unit is the arm means 304 movable in vertical planes and carrying front wheels 305. Piston-cylinder means 306 may be connected between front body section 301 and arms 304 for determining the relative positions of arms 304 and body portion 301. Similarly, arm means 307 are pivoted to and extend rearwardly from the driven axle unit and carry rear wheels 308. Piston-cylinder means 309 are connected between arm means 307 and rear body portion 302 to determine the relative positioning thereof.

Drive means 310 connect the driven center axle drivingly with the front and rear wheels in a manner already described in connection with the previous modifications.

FIGURE 26 shows the arrangement of FIGURE 25 in diagrammatic plan. In this figure the driving connections from the driven center axle to the several wheels will clearly be seen, and it will also be seen that the front wheels 305 are preferably steerable.

FIGURES 27 and 28 show a modification in which the driven center axle unit is indicated at 310′ and pivotally mounted thereon are the front and rear body parts 311 and 312, respectively, connected by the articulation piston-cylinder means 313. Swivelly mounted on the driven axle unit are the forwardly extending arms 314, each of which has pivoted to the outer end thereof a frame 315 consisting of two arms 315a and 315b, and each of these arms carries a wheel 316, these wheels, preferably, being steerable, as indicated in FIGURE 28.

Similarly, arms 317 are pivoted to the center driven axle structure and extend rearwardly therefrom, and on the rear end of each of these arms is pivoted a frame 318 having arms 318a and 318b that carry the wheels 319. Piston-cylinder means 320 and 321 may be provided which are connected between the front and rear body portions, respectively, and the corresponding one of the said arms 314 and 317 for predetermining the relative positions thereof.

FIGURE 28 shows the FIGURE 27 arrangement in diagrammatic plan and in this view it will be seen that there is included in each of the arms 314 a drive 322 leading along the arm and that within each of the said frames 315 and 318 there is provided drive means 323 leading to the wheels carried by the frame, so that all of the wheels illustrated can be driven by the source of power connected with the driven center axle structure.

Figure 29:
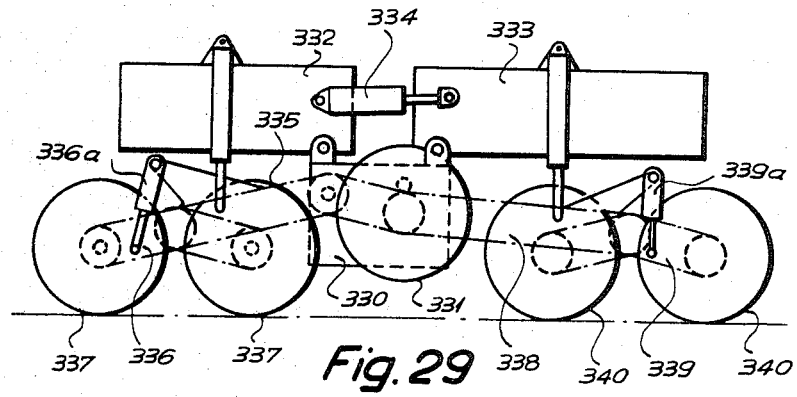
FIGURE 29 is a diagrammatic side view of still a further modification.
Figure 30:
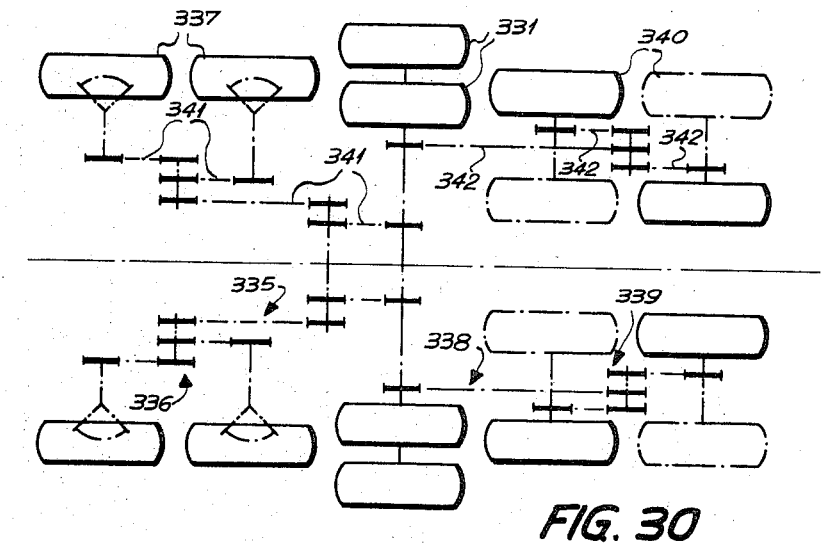
FIGURE 30 is a plan view of the modification of FIGURE 29.
Figure 31:
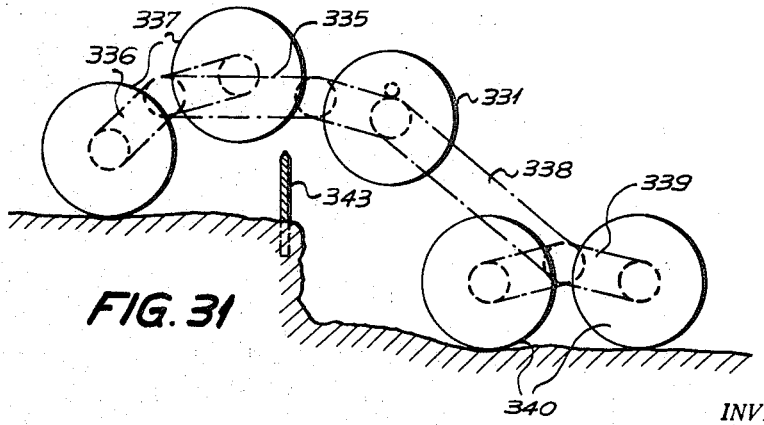
FIGURE 31 is a rather diagrammatic view showing how the modification of FIGURES 29 and 30 can step over an obstruction.

FIGURES 29, 30 and 31 show a still further modified arrangement in which the center axle unit 330 carries the driven center wheels 331 while pivotally supported on the center axle unit is the front body section 332 and the rear body section 333. These body sections may be connected by the articulation piston-cylinder means 334. Pivoted to the center axle structure and extending forwardly therefrom are the wheel support arms 335, which, at their outer ends carry the two armed frames 336 that support at the ends of the arms thereof the front wheels 337 which, as will be seen in FIGURE 30, are steerable.

Also, pivotally connected with the driven axle unit and extending rearwardly therefrom are the arms 338 that carry the double armed frame means 339 at the rear and rotatably mounted on the ends of the arms thereof are the rear wheels 340. These rear wheels, as will be seen in FIGURE 30, are preferably in the form of dual wheels so that the vehicle can carry greater loads than some of the other modifications.

As in the other modifications, drive means are provided extending from the driven center axle to the front and rear wheels. In FIGURE 30 the drive means leading from the center axle to the front wheels is indicated at 341, and the drive means leading from the center axle to the rear wheels is indicated at 342.

It will be understood that in every case the drive means is preferably associated directly with the arms or frames supporting the wheels, and is flexible at least in the plane of movement of the wheels. For example, chain sprocket drive means, as disclosed in a previous modification, is suitable for this purpose, but other drive arrangements are not excluded.

FIGURE 31 shows the facility with which a modification to FIGURES 29 and 30 can pass over an obstruction, such as the obstruction indicated at 343. In this connection it will be appreciated that the auxiliary frames 336 and 339 can be connected with their supporting arms 335 and 338 by hydraulic means that can determine the positions to which the frames are pivoted about their supporting arms. Note, for example, in FIGURE 31 the position occupied by the frame 336, which position is obtained by the hydraulic operator connected between frame 336 and its supporting arm 335. Such an operator might take the form of a double acting motor 336a connected to a source of pressure fluid by way of a reversing valve, preferably an open center valve so the frame 336 could float in normal operation. Corresponding operators 339a are connected between the rear frames 339 and their supporting arms 338.

Figure 32:
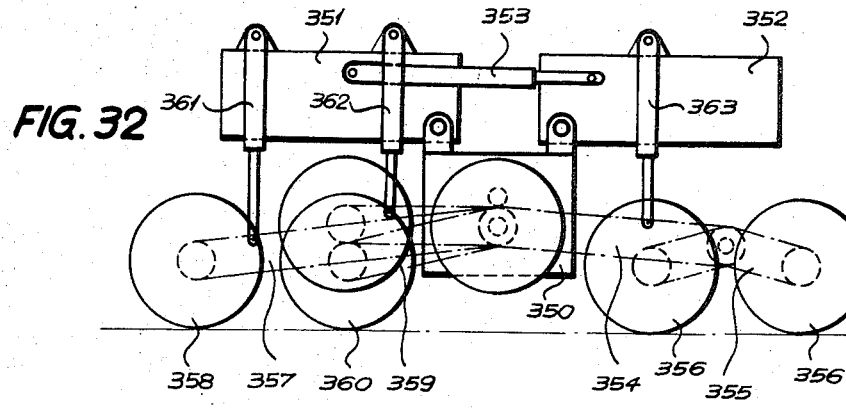
FIGURE 32 is a diagrammatic side elevational view of a still further modification.
Figure 33:
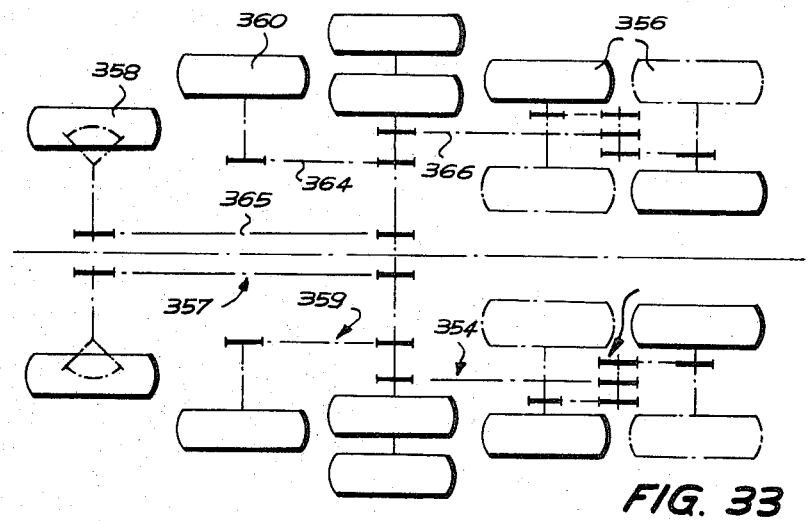
FIGURE 33 is a plan view thereof.
Figure 34:
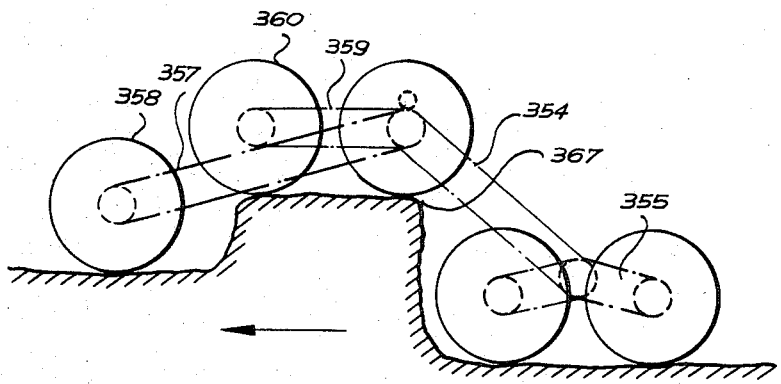
FIGURE 34 is a diagrammatic view showing how the modifications of FIGURES 32 and 33 can step over an obstruction.

FIGURES 32 through 34 show a modified arrangement in which the center driven axle 350 has pivoted thereto front body section 351 and rear body section 352, which sections are interconnected by the articulation piston-cylinder means 353. In this modification the rearwardly extending arms 354 are pivoted to the center axle structure and pivotally support at their rear ends the frames 355 which carry the dual rear wheels 356. The forwardly extending arms in this modification consist of two pairs of arms, the arms 357 carrying the wheels 358 at their one end and being pivoted to the center axle structure at their other ends, and the shorter arms 359 being pivoted at their rear ends to the center axle structure carrying the wheels 360 at their front ends. Cylinder pistons 361 are connected between the front body section and arms 357 while cylinder pistons 362 are connected between the front body section and the other forwardly extending arms 359. Cylinder-piston means 363 are connected between the rear body section 352 and the rearwardly extending arms 354.

As will be seen in FIGURE 33, drive means 364 lead from the center axle to wheels 360, while drive means 365 lead from the center drive axle to wheels 358. These last mentioned wheels are preferably steerable. Drive means 366 lead from the center axle structure through the arms 355 to the rear wheels 356. In this manner all of the wheels of the vehicle can be driven.

The vehicle is shown stepping over an obstruction 367 in FIGURE 34 and which stepping over is accomplished by controlling the several piston and cylinder means associated with the vehicle body sections and the several wheel supporting arms.

Figure 35:
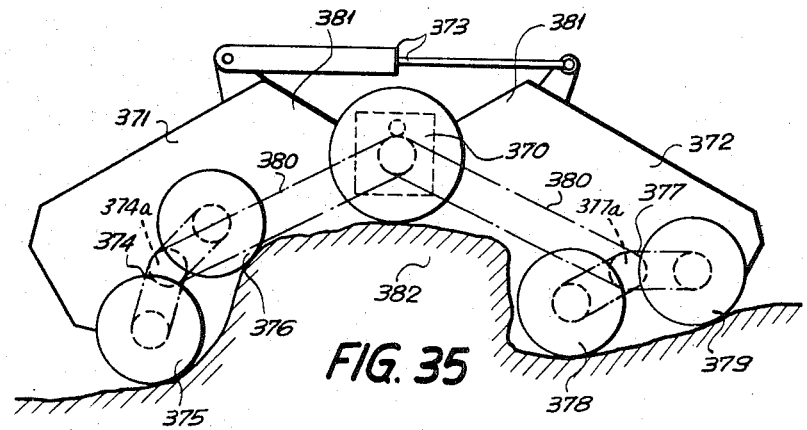
FIGURE 35 is a side view showing another modification.

In FIGURE 35 there is shown a modification in which there is a center driven axle unit 370 to which is pivotally connected a front body section 371 and a rear body section 372, with there being an articulation piston-cylinder means 373 connected between the body sections.

In this modification the front body section pivotally supports a frame 374 on pivot axis 374a on which the wheels 375 and 376 are mounted, while the rear body section 372 pivotally carries a similar frame 377 on a pivot axis 377a on which the wheels 378 and 379 are mounted. The wheels 375 and 376 are preferably steerable and to this end the front body portion may be substantially heavier than the rear body portion, so that the rear body portion can be elevated to accomplish steering of the vehicle. Drive means 380 is provided leading from the center axle structure to the wheels on the front and rear body sections.

In this modification it will be observed that the front and rear body sections are beveled off at 381 at the ends thereof which are adjacent each other, which will permit the body sections to be tilted upwardly to a swayback configuration for the vehicle, thereby enabling the vehicle to negotiate deep trenches with ease while at the same time the vehicle can readily step over an obstruction such as the one illustrated at 382 in FIGURE 35.

Figure 36:
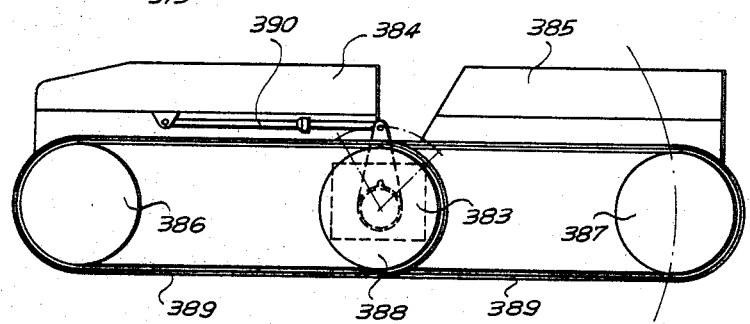
FIGURE 36 is a side view showing a still further modification.
Figure 37:
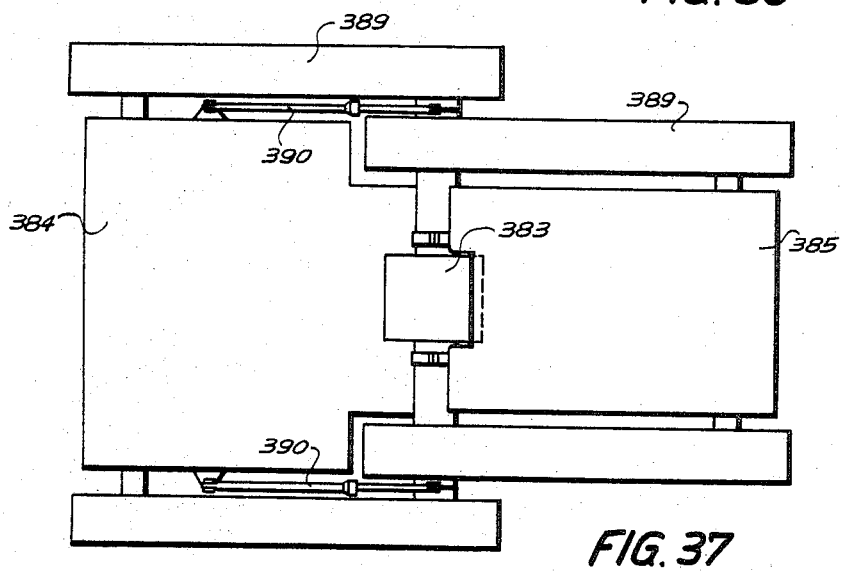
FIGURE 37 is a plan view of the modification of FIGURE 36.

FIGURES 36 and 37 show a modification or variant of the modification of FIGURE 35 wherein the center driven axle unit 383 pivotally carries front body section 384 and rigidly carries rear body section 385. These body sections carry the wheel means 386 and 387, respectively. The wheels 388 on the driven axle 383 are dual wheels and are connected with the front and rear wheels by the endless tracks 389 which will readily be perceived upon reference to FIGURE 37. Relative swiveling between the front body section and the center axle unit is possible by means of the articulation piston-cylinder means 390 connected therebetween.

Steering of the modification of FIGURES 35 and 36 can be effected in a conventional manner by braking the endless track means on one side of the vehicle, while the endless track means on the other side is driven. During steering, the rear body section 385 is preferably elevated.

In the modification of FIGURES 38 and 39 the center axle unit 391 has two axles 392 and 393 with axle 392 being driven as by pinion 394 and with the rear axle 393 being driven through the endless track 395 that passes about the wheels on the ends of the axles.

Arms 396 are pivoted to the center axle unit and extend forwardly therefrom and carry the steerable front wheels 397. Similarly rearwardly extending support arms 398 are pivoted to the center axle unit and at their ends carry the rear wheels 399. The vehicle body 400 rests on the center axle means and piston-cylinder means 401 and 402 are connected between the body and the arms 396 and 398 respectively. This body could, of course, be subdivided into parts as in the previous modifications, if so desired, and the parts be connected by articulation cylinder-piston means. The body is recessed as at 403 for receiving the front wheels and as at 404 for receiving the rear wheels.

FIGURES 40 and 41 show a variation of the modification of FIGURES 38 and 39, wherein the center drive axle unit 405 has two driven axles 406 and 407 which carry wheels 408 and 409 respectively. Forwardly extending arms 410 carry steerable front wheels 411, while rearwardly extending arms 412 carry the rear wheels 413. Body means 414 is mounted on the center axle unit and connected between the body unit and the forwardly and rearwardly extending arms are the cylinder-piston means 415 for the rearwardly extending arms and 416 for the forwardly extending arms, so that all of the arms are individually swivelable about the vehicle axles. It is understood that drive means lead to all of the wheels, as has been described in connection with the other modifications, preferably chain sprocket drives of the nature already disclosed.

According to the embodiment shown in FIGURES 42 through 44 the driving and steering members of the vehicle and the driving and control members for the hydraulic power plant for moving individual wheels in the vertical direction are shown in greater detail.

The cross-country vehicle is provided with a raised chassis 501 in which the driving engine 502 and the axle 503 of the centre wheels are rigidly arranged. The said axle is connected to the engine 502 via the differential gear 504 (FIGURES 42 and 43). The reference numeral 505 designates the front wheels, 506 the center wheels and 507 the rear wheels. The front wheels 505 are arranged on floating twin frames 508 so as to be movable in the vertical direction by a relatively large amount (FIGURE 42). Furthermore, they are connected via half axles 508a, with a front differential gear (not shown) through which they are driven by differential gear 504 via power transmitting members. Moreover, the front wheels can be steered by the steering wheel 512 via a linkage (not shown).

The rear wheels are supported on swivel arms 513 which can be individually raised or lowered about the axle 503 of the center wheels 506 (FIGURE 42). Also arranged in the swivel arms 513 is a drive transmission (e.g. a chain transmission) through which each rear wheel is rigidly connected for rotary movement with the corresponding center wheel.

The cross-country vehicle is provided with a hydraulic power plant which comprises, substantially, a tank 520 for the hydraulic medium, in the present case hydraulic oil, two oil pumps 521, two control valves 522, 523, various pressure cylinders, pressure lines and stop valves. The two oil pumps are continuously driven by the driving engine 502 and circulate the oil, while the engine is running, continuously through the hydraulic system. Each rear wheel arm 513 has associated therewith a pressure cylinder 524, 525 connected to the oil pumps 521 via the control valves 522 and 523, and the two lines 526, 527 and 528, 529, respectively. As shown by the diagrammatic view of the system in FIGURE 43, the control valve 522 is designed to actuate the left-hand pressure cylinder 524; depending on the movement of the control lever 522a it will positively force out or pull in the pressure piston 524a. The control valve 523 analogously actuates the right-hand pressure cylinder 525 with its pressure piston 525a.

As seen in FIGURE 42, the pressure pistons 524a, 525a are swivelled to levers 513a which project from the arms 513 at an angle and are connected therewith and reinforced by struts 513b. If oil is supplied into the cylinder 524 through line 526 by means of the control valve 522, the piston 524a is forced out of the cylinder 524, the left-hand arm and the left-hand rear wheel 507 are swivelled down so that the left-hand center wheel 506 and the whole left-hand half of the vehicle are raised. If pressure oil is forced through line 527, the left-hand rear wheel 507 is returned to normal position, i.e. raised from the normal road position of the vehicle (FIGURE 42). The same applies to the right-hand half of the vehicle, depending on the movement of the control lever 523a.

Associated with the front wheels 505 are pressure cylinders 530, 531. Their top ends are swivelled to frame 501 while their lower ends are swivelled to the twin frames 508 so that they can follow the vertical swivelling motions of the front wheels. The pressure cylinders 530, 531 are indirectly connected, via lines 535, 536 and also via the left-hand control valve 522, with one oil pump 521. Furthermore, they are in direct communication with one another via the lines 535 and 536.

As shown in FIGURE 43, stop valves 537, 538, 539 are so inserted in the hydraulic lines that the pressure cylinders of the left-hand half of the vehicle can be hydraulically disconnected from those of the right-hand half of the vehicle, the two rear cylinders from those in front, and the two front cylinders from one another.

The control lever 522a, according to the diagram of FIGURE 43, controls the lowering motion of one or two rear wheels 507 and of one or both front wheels 505, depending on the position of the stop valves 537, 538. The control lever 523a controls the raising motion of the rear wheels 507, while the two front wheels cannot be positively raised by hydraulic action. By adequate actuation of the stop valves 528, 529, they can, however, be immobilized in the extended, i.e. lowered position.

When all stop valves are opened and the control valves closed, all pressure cylinders communicate and form a joint hydraulic cushioning system for the wheel units since the whole oil volume inside them is constant. In addition, two central mechanical springs 540, 541 (FIGURE 43) are provided each (in a cylinder having a piston engaged by the respective spring on one side with the pistons on their other sides) being connected to the pressure lines for the rear and the front cylinders, respectively, via stop valves 542, 543. When the valves 542 and 543 are open, the hydraulic plant therefore forms a communicating cushion by which the front and rear wheel units are resiliently supported by the mechanical pressure springs 540, 541. It would also be possible to provide only a central mechanical suspension which is hydraulically connected to all four pressure cylinders.

It is thus possible, by means of the hydraulic plant described, to lower the front wheels individually or together and to move the rear wheels up or down individually or together. This possibility lends the vehicle an exceptional degree of cross-country mobility; even when under maximum service load, the vehicle may, by way of example, scale a vertical wall of over 1 meter height, which has a small trench in front of it. The vehicle backs up to the wall with the rear wheels raised until they firmly rest against it. With the drive locked, the rear wheels are forced down, if necessary, as far as they will go. In this position, the vehicle will continue in reverse, thanks to the rear-wheel drive, until the centre wheels also engage the wall. The crew then moves, if necessary, to the rearmost portion of the vehicle whereupon the rear wheels are swivelled back into their normal position, i.e. the vehicle is swivelled up with the front wheels into a position almost horizontal. The swivelling movement may, if necessary, be assisted by forcing the front wheels down. The vehicle can then continue to travel backwards. Climbing down from the wall is performed in a similar manner, in the opposite direction and in inverse order.

For prolonged travel along a slope, the vehicle may be rotated about its longitudinal axis by actuating the two left or right-hand pressure cylinders until the inclination of the slope is at least approximately compensated. The centre wheel on the valley side will not touch the ground. The front-wheel cylinder on the valley side being blocked by means of the associated stop valve, tilting is impossible even when the direction of travel is changed towards the valley.

If the vehicle is bogged down, one rear wheel may first be raised and have a plank placed under it; the same procedure is followed for the other rear wheel. Then the two rear wheels are forced down and thereby the centre axis, which is under the greatest pressure, raised from the soft soil. The vehicle can then drive across the planks by means of the rear-wheel drive. The above are only the three most important cases of practical application.

In order to turn the vehicle within its own radius, the centre wheels may be individually braked or locked in the manner kown per se. By slightly raising the rear wheels, the vehicle can be turned about the centre point, the front and rear wheels, owing to being relieved by the raised rear wheels, sliding over the ground obliquely to their turning plane. The process is similar in a left-hand turn, the left-hand centre wheel being braked or completely locked.

The frame of the vehicle may have its underside closed by a tub-like casing (not shown) extending between the wheels beneath the driver's seat, the differential gear 504. This arrangement will protect the crew and the cargo if the vehicle travels across bogs or swamps. In order to improve the cross-country mobility of the vehicle still further, the centre wheels can also be equipped with an endless track known per se, small auxiliary supporting wheels or rollers on a suitable frame being provided. The centre and rear wheels may also be connected by the endless tracks. In this case the rotary drive in the swivel arms may be dispensed with.

The vehicle of the present invention is highly versatile and is particularly useful as a cross country vehicle, since it can negotiate difficult terrain, even when the exact nature of the terrain is unknown beforehand. The vehicle is particularly well adapted for military use, either as an ammunition carrier, as a troop-transport vehicle, or as a self-propelled mount for a small gun (FIG. 44). In this view, the vehicle generally is shown at 604 and the front wheels are shown at 607, the center wheels at 606 and the rear wheels at 609. Wheels 609 are carried on vertically movable arms 608. The driver's compartment is at 605 and the compartment at 600, pivotal on vertical axis 601 is for the gunner who controls guns 602 swingable vertically within the range of angle 603. Except for the position of the steering wheel in FIGURE 44, the basic vehicle arrangement is the same as that of FIGURES 42 and 43.

Any of the several modifications that have been described above can be provided with railroad wheels and run on railroad tracks, and in those arrangements where there are spaced wheels carried by the centre axle structure, these wheels could be formed as railroad wheels and engage the railway tracks, while the front and rear wheels are lifted upwardly; whereas, for driving the vehicle on the ground the centre portion of the vehicle would be raised upwardly. For example, the modification of FIGURES 38 and 40 could be operated in this manner.

All of the several vehicles disclosed in this application, including those somewhat diagrammatically illustrated, are characterized in the following several advantages, as well as many other advantages not specifically identified in the following list:

(a) The active swivelling movement of individual exterior wheels in the wheel plane enables obstacles of all kinds and deep trenches with vertical walls to be overcome without difficulty.

(b) Raising individual exterior wheels and locking one or more centre wheels enables the vehicle to be turned within its radius, the turning radius not exceeding, by way of example, one half of the length of the vehicle.

(c) The lateral stability of the vehicle is very high despite the excellent cross-country mobility thanks to the fact that the centre wheel axle is rigidly connected to the frame without springs (no shifting of weight owing to the resilience of the springs).

(d) Certain embodiments can traverse slopes with the body of the vehicle in horizontal position.

(e) Good ground clearance by raising the centre axle or axles (crossing of river with raised engine).

(f) Suitable locking of the hydraulic system enables it to be employed to cushion those exterior wheels which rest on the ground when travelling on roads.

(g) The additional control of the hydraulic plant enables the ground pressure to be distributed among the wheels in accordance with all individual requirements.

(h) No separate tools for lifting wheels are required (except jacks) for changing wheels, applying tracks and the like since the wheels can be positively raised.

In the foregoing description and the following claims, reference is made in various places to the vehicle being driven by a motor but it will be apparent that in most cases the driving of the vehicle will be by way of an internal combustion engine, such as a gasoline engine or a diesel engine. The invention, however, is not particularly concerned with the particular driving means employed and thus it is intended to encompass within the purview of this invention arrangements in which other prime mover arrangements will be provided, even including the possibility of battery driven vehicles in which electric motors are employed.

It will also be noted that, while in most cases, the raising and lowering of the wheel supporting arms, and the tilting of the sections of the vehicle frame or body relative to each other will be accomplished by piston and cylinder means, and it is intended to encompass within the purview of this invention the use of other types of fluid motors, including rotary fluid motors and the like. Accordingly, it will be understood that the term "fluid motor" is employed in order to obtain the proper scope in this application.

The vehicle body could be a body of the type not requiring any auxiliary frame or it could be of the type in which there is a frame and body section secured to the frame. It will thus be understood that the vehicle body and the frame, where such a frame is required, which is integral with the body is intended wherever the term "body," "body sections," or "frame" is employed.

It will be understood that this invention is susceptible to modification in order to adapt it to different usages and conditions and accordingly, it is desired to comprehend such modifications within this invention as may fall within the scope of the appended claims.

What is claimed is:

1. In a cross-country vehicle; driven center axle means, at least two relatively tiltable body sections each having one end connected to said center axle means, wheel means at the ends of said center axle means driven thereby, wheel supporting arm means located both forwardly and rearwardly of said center axle means and disposed at the lower sides of pertaining body sections, wheel means supported at the one ends of said arm means, said arm means being pivotally supported at their other ends for pivotal movement in a vertical plane relative to said center axle means and independently of each other, means connected between said arm means and the pertaining body sections and selectively operable for causing the said pivotal movement of said arm means and means operatively connected between one of said body sections and the said arm means pertaining to the other body section and selectively operable for adjusting the angularity of said one body section relative to the said arm means pertaining to the other body section.

2. In a cross-country vehicle; driven center axle means, at least two relatively tiltable body sections each having one end connected to said center axle means, wheel means at the ends of said center axle means driven thereby, wheel supporting arm means located both forwardly and rearwardly of said center axle means and disposed at the lower sides of pertaining body sections, wheel means supported at the one ends of said arm means, said arm means being pivotally supported at their other ends for pivotal movement in a vertical plane relative to said axle means and independently of each other, hydraulically operable means connected between said arm means and the pertaining body sections and selectively operable for causing the said pivotal movement of said arm means, and means operatively connected between one of said body sections and the said arm means pertaining to the other body section and selectively operable for adjusting the angularity of said one body section relative to the said arm means pertaining to the other body section.

3. In a cross-country vehicle; driven center axle means, at least two relatively tiltable body sections each having one end connected to said center axle means, wheel means at the ends of said center axle means driven thereby, wheel supporting arm means located both forwardly and rearwardly of said center axle means and disposed at the lower sides of pertaining body sections, wheel means supported at the one ends of said arm means, said arm means being pivotally supported at their other ends for pivotal movement in a vertical plane relative to said axle means and independently of each other, hydraulically operable piston and cylinder means connected between said arm means and the pertaining body sections and selectively operable for causing the said pivotal movement of said arm means, and means operatively connected between one of said body sections and the said arm means pertaining to the other body section and selectively operable for adjusting the angularity of said one body section relative to the said arm means pertaining to the other body section.

4. In a vehicle having at least six wheels and provided with a motor for driving said vehicle and also provided with a transmission block having transmission elements therein connected to said motor and with a vehicle body: said body having a front section with a driver's seat and a rear load-carrying section, transverse shaft means extending transverse to the longitudinal direction of said vehicle and pivotally interconnecting said front and said rear sections to allow tilting of each of said sections about the axis of said transverse shaft means, said transverse shaft means including a tubular member fixedly connected to said transmission block, drive shaft means drivingly connected to said transmission elements and extending through said tubular member, two pairs of arms provided with bearing means tiltably mounted on said tubular member, one of said pairs of arms extending from said tubular member in forward direction of said vehicle and the other one of said pairs of arms extending from said tubular member in rearward direction of said vehicle, a pair of said wheels pertaining to each said pair of arms, the outer ends of each of said arms carrying a corresponding one of said wheels, another pair of said wheels carried at the ends of said tubular member, means drivingly connecting said other pair of wheels to said drive shaft means, and means extending through said arms and connecting said drive shaft means with the pairs of wheels pertaining to said arms, longitudinally adjustable supporting means connecting at least one of said pairs of arms with the respective adjacent body section, and hydraulically operable means operatively connected to said tubular member and to one of said pairs of arms and operable selectively to angularly adjust said tubular member and said one pair of arms relative to each other and to lock the same in any desired adjusted position.

5. A vehicle according to claim 4, in which said load-carrying section is a water-tight body, and in which said front section is in the form of a second water-tight body encasing said motor and said transmission.

6. A vehicle according to claim 5, which includes blades detachably mounted on at least some of said wheels for selective employment of said vehicle as water vehicle.

7. In a vehicle having at least six wheels and provided with a motor in the front portion of said vehicle for driving the same, said vehicle also being provided with a transmission block having transmission elements therein connected to said motor and with a vehicle body: said body having a front section with a driver's seat and a rear load-carrying section, transverse shaft means extending transverse to the longitudinal direction of said vehicle and pivotally interconnecting said front and said rear sections to allow tilting of each of said sections about the axis of said transverse shaft means, said transverse shaft means including a tubular member fixedly connected to said transmission block, a two-part drive shaft drivingly extending through said tubular member, a single differential transmission forming a part of said transmission elements and interposed between and drivingly connected to said two-part drive shaft, two pairs of arms provided with bearing means tiltably mounted on said tubular member, one of said pairs of arms extending from said tubular member in forward direction of said vehicle and the other one of said pairs of arms extending from said tubular member in rearward direction of said vehicle, a pair of said wheels pertaining to each said pair of arms, the outer ends of each of said arms carrying a corresponding one of said wheels, another pair of said wheels carried at the ends of said tubular member, means drivingly connecting said other pair of wheels to said drive shaft means, and means extending through said arms and connecting said drive shaft means with the pairs of wheels pertaining to said arms, longitudinally adjustable supporting means connecting at least one of said pairs of arms with the respective adjacent body section, and hydraulically operable means operatively connected to said tubular member and to one of said pairs of arms and operable selectively to angularly adjust said tubular member and said one pair of arms relative to each other and to lock the same in any desired adjusted position.

8. In a motor driven vehicle having six wheels: a frame having a front section with a driver's seat and a rear section with a load-carrying compartment, transverse shaft means extending transverse to the longitudinal direction of said vehicle and pivotally interconnecting said front and said rear sections to allow tilting of each of said sections about the axis of said transverse shaft means, two pairs of arms tiltably supported by said transverse shaft means, one of said pairs of arms extending from said shaft means in forward direction of said vehicle and the other one of said pairs of arms extending from said shaft means in rearward direction of said vehicle, a wheel supported on each free end of each of said arms and at each outer end of said transverse shaft means, stepdown transmission means respectively disposed between said shaft means and each of said wheels having input means connected to said shaft means and output means connected to the adjacent one of said wheels, hydraulically operable means operatively connected to one of said sections and to the said arms pertaining to the other section and operable selectively to angularly adjust one of said sections relative to the said arm pertaining to the other section and to lock the same in any desired adjusted position, and hydraulically operable longitudinally adjustable supports connected between each of said arms and the adjacent frame section.

9. In a motor driven vehicle; a frame having a front section and a rear section, shaft means extending transverse to the longitudinal direction of said vehicle pivotally interconnecting said front and rear sections to permit tilting thereof relative to each other, first and second arm means tiltably supported on said shaft means and one thereof extending forwardly from said shaft means and the other thereof extending rearwardly from said shaft means, wheel means carried on the outer end of each said arm means, longitudinally adjustable supporting means connected between each of said arm means and the respective adjacent frame section, and hydraulically operable means operatively connected between one of said sections and the arm means extending from said shaft means in a direction opposite to the said one section and operable selectively to adjust said one section and the last mentioned arm means angularly relative to each other and to lock the same in any desired adjusted position.

10. A vehicle according to claim 9 in which at least some of said forward and rearward wheel means comprise pairs of wheels spaced in the fore and aft direction, a frame for each said pair of wheels supporting the said wheels, and each said frame being pivotally connected intermediate the wheels thereon to the pertaining said arm means.

11. A motor driven vehicle according to claim 9 in which said hydraulically operable means comprises a single double acting piston cylinder means, and the said arms means to which the piston cylinder means are connected comprising a single arm means.

12. A motor driven vehicle according to claim 9 in which said hydraulically operable means comprises a pair of double acting cylinder piston means arranged at respectively opposite sides of the vehicle and the arm means to which the piston cylinder means is connected comprising individual arm means respectively located on each side of the vehicle.

13. A cross-country vehicle according to claim 9 in which a double acting fluid motor is operatively connected between each said frame and its respective arm means selectively operable for tilting the frame on its respective arm means and also operable for permitting free floating pivotal movement of the said frame on its respective arm means.

14. In a motor driven vehicle: a frame having a front section and a rear section, shaft means extending transverse to the longitudinal direction of said vehicle pivotally interconnecting said sections to permit tilting of the sections relative to each other, two pairs of arms tiltably supported by said shaft means and one pair extending forwardly therefrom and the other pair rearwardly therefrom, the outer ends of each of said arms and the ends of said shaft means having wheels thereon, hydraulically longitudinally adjustable supporting means between the outer ends of said arms and the respective frame sections, and hydraulically longitudinally adjustable means connected between points fixed on said front section and points on said arms extending rearwardly and operable selectively for adjusting said sections angularly relative to each other and for locking said sections in any desired adjusted position.

15. In a multisectional engine driven vehicle: axle means, wheel means on the ends of said axle means and driven thereby, a front body section attached to said axle means, a rear body section pivoted at its front to said axle means, front wheels beneath the front end of said front body section, a first set of arms pivoted at their rear ends to said axle means and supporting said front wheels at their front ends, rear wheels beneath the rear end of said rear body section, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, the two motors of each set being connected in parallel, means for supplying fluid to and entrapping fluid in said sets of motors, and means pertaining to at least said third set of motors for interconnecting the opposite ends thereof.

16. In a multisectional engine driven vehicle: axle means driven by the engine of the vehicle, a front body section attached to said axle means, a rear body section pivoted at its front to said axle means, front wheels beneath the front end of said front body section and rear wheels beneath the rear end of said rear body section, means drivingly connecting said wheels with said axle means, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, means connecting the motors of said first set in parallel and the motors of said second set in parallel, a source of fluid under pressure, means for entrapping fluid in said first and second sets of motors or for connecting said source with one side or the other of said first set of motors or with said second set of motors, and means for individually entrapping fluid in the motors of said third set of motors or for reversibly connecting said source with the individual motors of said third set of motors.

17. In a multisectional engine driven vehicle: axle means, wheel means on the ends of said axle means and driven thereby, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, means connecting the motors of said first set in parallel and the motors of said second set in parallel, a source of fluid under pressure, means for entrapping fluid in said first and second sets of motors or for connecting said source with one side or the other of said first set of motors or with said second set of motors, means for reversibly connecting said source with the individual motors of said third set of motors and for entrapping fluid therein, and means for selectively interconnecting the opposite ends of each of said third set of motors.

18. In an engine driven vehicle: axle means comprising an outer housing and an inner axle, wheels carried by the axle means and driven by said inner axle, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a fluid motor between the outer end of each arm and the body section thereabove, means for supplying fluid to and entrapping fluid in said fluid motors, and means for selectively adjusting the angular position of at least one of said sets of arms relative to said axle means, said arms being hollow and there being drive means therein drivingly connecting each front and back wheel with the center wheel on the same side of the vehicle, said inner axle of said center axle means comprising opposite end parts and a differential unit connecting said end parts to provide for differential movement thereof.

19. In an engine driven vehicle: axle means comprising an outer housing and an inner axle, wheels carried by the axle means and driven by said inner axle, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a fluid motor between the outer end of each arm and the body section thereabove, means for supplying fluid to and entrapping fluid in said fluid motors, and means for selectively adjusting the angular position of at least one of said sets of arms relative to said axle means, said arms being hollow and there being drive means therein drivingly connecting each front and back wheel with the center wheel on the same side of the vehicle, said inner axle of said center axle means comprising opposite end parts and a differential unit connecting said end parts to provide for differential movement thereof, and means selectively operable for locking up said differential unit to cause all of the wheels of the vehicle to be drivingly interconnected.

20. In a multisectional engine driven vehicle: axle means, wheel means on the ends of said axle means and driven thereby, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, the two motors of each set being connected in parallel, a source of fluid under pressure, a main valve having an inlet port connected to said source and also having an exhaust port and two service ports, said main valve being shiftable for connecting said inlet port to either of said service ports while simultaneously connecting the other service port to the exhaust port or for interconnecting said service ports, a first three way valve having a first port connected to one of said service ports, a second port connected to one side of said first set of motors, and a third port, a second three way valve having a first port connected to said third port of the first three way valve and having a second port connected to said second set of motors and a third port connected to one side of said third set of motors, and a third three way valve having a first port connected to the other of said service ports and having a second port connected to the other side of said first set of motors and another port connected to the other side of said third set of motors, each three way valve being shiftable for selectively connecting its said first port with either of said second or third ports thereof.

21. In a multisectional engine driven vehicle: axle means, wheel means on the ends of said axle means and driven thereby, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, the two motors of each set being connected in parallel, a source of fluid under pressure, a main valve having an inlet port connected to said source and also having an exhaust port and two service ports, said main valve being shiftable for connecting said inlet port to either of said service ports while simultaneously connecting the other service port to the exhaust port or for interconnecting said service ports, a first three way valve having a first port connected to one of said service ports, a second port connected to one side of said first set of motors, and a third port connected to one side of said third set of motors, and a second three way valve having a first port connected to the other service port and a second port connected to the other side of said first set of motors and a third port connected to the other side of said third set of motors and to said second set of motors.

22. In a multisectional engine driven vehicle: axle means, wheel means on the ends of said axle means and driven thereby, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular position thereof relative to said axle means, fluid pressure supply means, first and second main valves each having an inlet port connected to said supply means and each having an exhaust port and two service ports, each main valve being shiftable for connecting the inlet port wtih either of said service ports while connecting the other service port to the exhaust port or for interconnecting said service ports, a first three way valve having a first port connected to one of said service ports of said first main valve and a second port connected to one side of said first set of motors and a third port connected to one side of one of said third set of motors, a second three way valve having a first port connected to the other of said service ports of said first main valve and a second port connected to the other side of said first set of motors and a third port connected to the other side of the said one motor of said third set of motors, and a third three way valve having a first port connected to one of the service ports of said second main valve and a second port connected to said second set of motors and a third port connected to one side of the other one of said third set of motors, the other side of said other one of said third set of motors being connected to the other service port of said second main valve.

23. In a multisectional engine driven vehicle: axle means, wheel means on the ends of said axle means and driven thereby, a front body section attached to said axle means, a rear body section pivoted at its front to said axle means, front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a first set of double acting fluid motors connected between the outer ends of said first set of arms and the front body section thereabove, a second set of expansible fluid motors connected between the outer ends of the second set of arms and the rear body section thereabove, means comprising a third set of double acting motors connected between said axle means and the arms of one of said sets of arms for selectively adjusting the angular positon thereof relative to said axle means, fluid pressure supply means, first and second main valves each having an inlet port connected to said supply means and each having an exhaust port and two service ports, each main valve being shiftable for connecting the inlet port with either of said service ports while connecting the other srevice port to the exhaust port or for interconnecting said service ports, a first three way valve having a first port connected to one of the service ports of said first main valve and a second port connected to one side of said first set of motors and a third port, a second three way valve having a first port connected to the third port of said first three way valve and having a second port connected to said second set of motors and a third port connected to one side of one of the motors of said third set of motors, a third three way valve having a first port connected to one of the service ports of said second main valve and a second port connected to the other side of said first set of motors and a third port connected to one side of the other one of said third set of motors, the other sides of said third set of motors being connected together and with the other service port of said second main valve.

24. A motor driven vehicle comprising in combination; a vehicle body having a front section and a rear section, transverse shaft means extending transversely of the vehicle from one side to the other thereof, said transverse shaft means pivotally interconnecting said front and said rear sections to allow tilting of each of said sections about the axis of said transverse shaft means, a first pair of wheels secured to the respective ends of said transverse shaft means, a first pair of elongated front swing arms each pivotally mounted on said transverse shaft means adjacent a respective end of the latter and extending forwardly from said transverse shaft means, each of said front swing arms being oscillatable independently of the other in a vertical plane, a second pair of relatively elongated rear swing arms each pivotally mounted on said transverse shaft means adjacent a respective end of the latter and extending rearwardly of the vehicle, each of said swing arms being oscillatable independently of the other in a vertical plane, a pair of steerable front wheels mounted on the free ends of said front swing arms, a pair of rear wheels mounted on the free ends of said rear swing arms, drive means respectively interconnecting said transverse shaft means with said front and rear wheels, and fluid actuated power means operatively connected between one of said sections and the swing arms pertaining to the other of said sections and between said sections and their respective swing arms to adjust said swing arms vertically relative to their respective sections and to adjust said one section angularly relative to the swing arms pertaining to said other section.

25. A motor driven vehicle according to claim 24 in which said fluid actuated power means comprise double acting hydraulically longitudinally adjustable motor means, and manually operable control means connected with said hydraulically longitudinally adjustable motor means.

26. A motor driven vehicle as claimed in claim 25 in which said transverse shaft means comprising an inner axle, said inner axle being divided and forming two opposite end parts each supporting a respective one of said first pair of wheels, a differential unit connecting the inner ends of said end parts to provide for differential movement thereof, and braking means for each wheel of said first pair of wheels for independently braking said first wheels.

27. In a motor driven vehicle; a frame having a front section and a rear section, central shaft means extending transverse to the longitudinal direction of said vehicle pivotally interconnecting said front and rear sections to permit tilting of the sections relative to each other about the axis of said central shaft means, two pairs of arms tiltably supported by said shaft means and one pair extending forwardly therefrom and the other pair rearwardly therefrom, the outer ends of each of said arms and the ends of said shaft means having wheels thereon, hydraulically longitudinally adjustable supporting means between said arms and the respective frame sections, said central shaft means include a non-rotatable housing to which said arms are pivoted and a rotatable axle inside said housing, a motor and a transmission block fixedly connected to said non-rotatable housing, two hydraulically operable cylinder piston means arranged on each side of said vehicle operatively connected to said housing and to one of said pairs of arms and operable selectively to angularly adjust said housing and said one pair of arms relative to each other and to lock the same in any desired adjusted position.

28. An articulated vehicle comprising, in combination, a central through driving axle extending transversely of the vehicle from one side to the other thereof; a first pair of wheels each secured to a respective end of said central axle, a pair of cylindrical casings each surrounding said central axle adjacent a respective wheel, means securing each of said casings against rotation relative to the vehicle, said casings rotatably supporting said central axle, a pair of relatively elongated substantially rectilinear hollow front swing arms each having, at one end, bearing means in engagement with the respective one of said casings for pivotal mounting of said front swing arms on said casings, each front swing arm extending forwardly of the vehicle and being oscillatable, independently of the other front swing arm, in a vertical direction, a pair of relatively elongated substantially rectilinear hollow rear swing arms each having, at one end, bearing means engaging a respective one of said casings for pivotal mounting of said rear swing arms on said casings, each rear swing arm extending rearwardly of the vehicle and each being oscillatable, independently of the other, in a vertical plane, a pair of front wheels each mounted in a respective front stub axle, each stub axle being secured to a corresponding free end of a respective one of said front swing arms, a pair of rear wheels each rotatably mounted on a respective rear stub axle secured to a corresponding free end of a respective one of said rear swing arms, a pair of drive sprockets secured to said central axle within each of said casings, drive chain means connecting one drive sprocket of each pair of the associated front stub axle and the other drive sprocket of each pair to the associated rear stub axle, each chain means extending through aperture means in the bearing means of the associated front and rear swing arms and through aperture means in the associated casing, and a device for selectively moving one of said pairs of front and rear swing arms vertically relative to the other pair thereof, said swing arms constituting the sole means structurally supporting said stub axles for vertical oscillation about said central axle.

29. An articulated vehicle comprising, in combination, a central through driving axle means extending transversely of the vehicle from one side to the other thereof, wheels secured to respective ends of said central axle means, cylindrical casings surrounding said central axle means adjacent a respective wheel, means securing each of said casings against rotation relative to the vehicle, said casings rotatably supporting said central axle means, a pair of relatively elongated substantially rectilinear hollow front swing arms each having, at one end, bearing means in engagement with a respective one of said casings for pivotal mounting of said front swing arms on said casings, each front swing arm extending forwardly of the vehicle and being oscillatable, independently of the other front swing arm, in a vertical direction, a pair of relatively elongated substantially rectilinear hollow rear swing arms each having, at one end, bearing means engaging a respective one of said casings for pivotal mounting of said rear swing arms on said casings, each rear swing arm extending rearwardly of the vehicle and each being oscillatable, independently of the other, in a vertical plane, a pair of front wheels each mounted in a respective front stub axle, each stub axle being secured to a corresponding free end of a respective one of said front swing arms, a pair of rear wheels each rotatably mounted on a respective rear stub axle secured to a corresponding free end of a respective one of said rear swing arms, a pair of drive sprockets secured to said central axle means within each of said casings, drive chain means connecting one drive sprocket of each pair to the associated front stub axle and the other drive sprocket of each pair to the associated rear stub axle, each chain means extending from the pertaining sprocket through the pertaining said arm, and a device for selectively moving one of said pairs of front and rear swing arms vertically relative to the other pair thereof, said swing arms constituting the sole means structurally supporting said stub axles for vertical oscillation about said central axle means.

30. In an engine driven vehicle; axle means comprising an outer housing and an inner axle, wheels carried by the axle means and driven by said inner axle, a front body section attached to said axle means, a rear body section pivoted at its front end to said axle means, steerable front wheels beneath the front end of said front body section and rear wheels beneath the rear end of said rear body section, a first set of arms pivoted at their rear ends to said axle means and supporting said front wheels at their front ends, a second set of arms pivoted at their front ends to said axle means and supporting said rear wheels at their rear ends, a fluid motor between the outer end of each arm and the body section thereabove, means for supplying fluid to and entrapping fluid in said fluid motors, two hydraulically longitudinal adjustable manually controlled cylinder piston means, one end of each said cylinder piston means being connected with said rear arms respectively and being spaced in vertical direction from said rear arm, the other end of said cylinder piston means being connected to said outer housing of said axle means for tilting of said rear arms around said axle means, said arms being hollow and drive means in said arms drivingly connecting each front and back wheel with the center wheel on the same side of the vehicle, said inner axle of said center axle means comprising opposite end parts and a differential unit connecting said end parts to provide for differential movement thereof.

References Cited

UNITED STATES PATENTS

| | | | |
|---|---|---|---|
| 1,130,314 | 3/1915 | McKaig | 180—21 |
| 1,810,635 | 6/1931 | White | 180—75 |
| 2,642,144 | 6/1953 | Brewer | 180—22 |
| 2,721,405 | 10/1955 | Gardner | 180—22 X |
| 2,906,358 | 9/1959 | Tucker | 180—23 |
| 2,934,157 | 4/1960 | Harp | 180—21 |
| 3,161,172 | 12/1964 | Kassbohrer | 180—24 X |

FOREIGN PATENTS

| | | |
|---|---|---|
| 121,530 | 12/1918 | Great Britain. |
| 359,322 | 5/1938 | Italy. |
| 582,256 | 9/1958 | Italy. |

A. HARRY LEVY, *Primary Examiner.*